(12) United States Patent
Urakawa et al.

(10) Patent No.: US 8,780,681 B2
(45) Date of Patent: Jul. 15, 2014

(54) RECORDING DEVICE AND RECORDING METHOD

(75) Inventors: Yoshiyuki Urakawa, Kanagawa (JP); Yuichi Suzuki, Kanagawa (JP); Junichi Horigome, Tokyo (JP)

(73) Assignee: Sony Corporation, Tokyo (JP)

( * ) Notice: Subject to any disclaimer, the term of this patent is extended or adjusted under 35 U.S.C. 154(b) by 506 days.

(21) Appl. No.: 13/150,328

(22) Filed: Jun. 1, 2011

(65) Prior Publication Data

US 2011/0305122 A1    Dec. 15, 2011

(30) Foreign Application Priority Data

Jun. 9, 2010   (JP) .................. 2010-132208

(51) Int. Cl.
*G11B 5/55*    (2006.01)
*G11B 20/00*   (2006.01)

(52) U.S. Cl.
USPC ..................... 369/53.28; 369/53.44

(58) Field of Classification Search
None
See application file for complete search history.

(56) References Cited

U.S. PATENT DOCUMENTS

| | | |
|---|---|---|
| 2008/0186840 A1 | 8/2008 | Uchiyama et al. |
| 2008/0205257 A1 | 8/2008 | Yamatsu et al. |
| 2009/0003183 A1 | 1/2009 | Miyamoto et al. |
| 2009/0147660 A1 | 6/2009 | Saito et al. |
| 2009/0168632 A1 | 7/2009 | Miyamoto et al. |

FOREIGN PATENT DOCUMENTS

| | | |
|---|---|---|
| JP | 2008-135144 A | 6/2008 |
| JP | 2008-176902 A | 7/2008 |
| JP | 2009-009635 A | 1/2009 |
| JP | 2009-140568 A | 6/2009 |
| JP | 2009-163811 A | 7/2009 |

*Primary Examiner* — Srilakshmi K Kumar
*Assistant Examiner* — Carl Adams
(74) *Attorney, Agent, or Firm* — Wolf, Greenfield & Sacks, P.C.

(57) ABSTRACT

A recording device performs recording on an optical disc recording medium having a reference face having a reflection film provided with a position guide, and a recording layer provided at a position of a depth different from that of the reference face and performing information recording by mark forming according to irradiation of light. The recording device includes a light generating and irradiation unit, a recording unit, a tracking mechanism, a first tracking error signal generating unit, a second tracking error signal generating unit, a tracking servo control unit, and a control unit.

6 Claims, 27 Drawing Sheets

| PIT ROW A | * | — | — | — | — | — | — | — | — | — | — | — | ⋮ |
|---|---|---|---|---|---|---|---|---|---|---|---|---|---|
| PIT ROW B | — | * | — | — | — | — | — | — | — | — | — | — | ⋮ |
| PIT ROW C | — | — | * | — | — | — | — | — | — | — | — | — | ⋮ |
| PIT ROW D | — | — | — | * | — | — | — | — | — | — | — | — | ⋮ |
| PIT ROW E | — | — | — | — | * | — | — | — | — | — | — | * | ⋮ |
| PIT ROW F | — | — | — | — | — | * | — | — | — | — | * | — | ⋮ |

* ON EACH PIT ROW IS 1ch bit

FIG. 6A

4ch bit = 1011 = Data bit "0"
4ch bit = 1101 = Data bit "1"

FIG. 6B

12ch bit = 1111 | 1111 | 1011 | = Sync1
12ch bit = 1111 | 1111 | 1101 | = Sync2

FIG. 6C

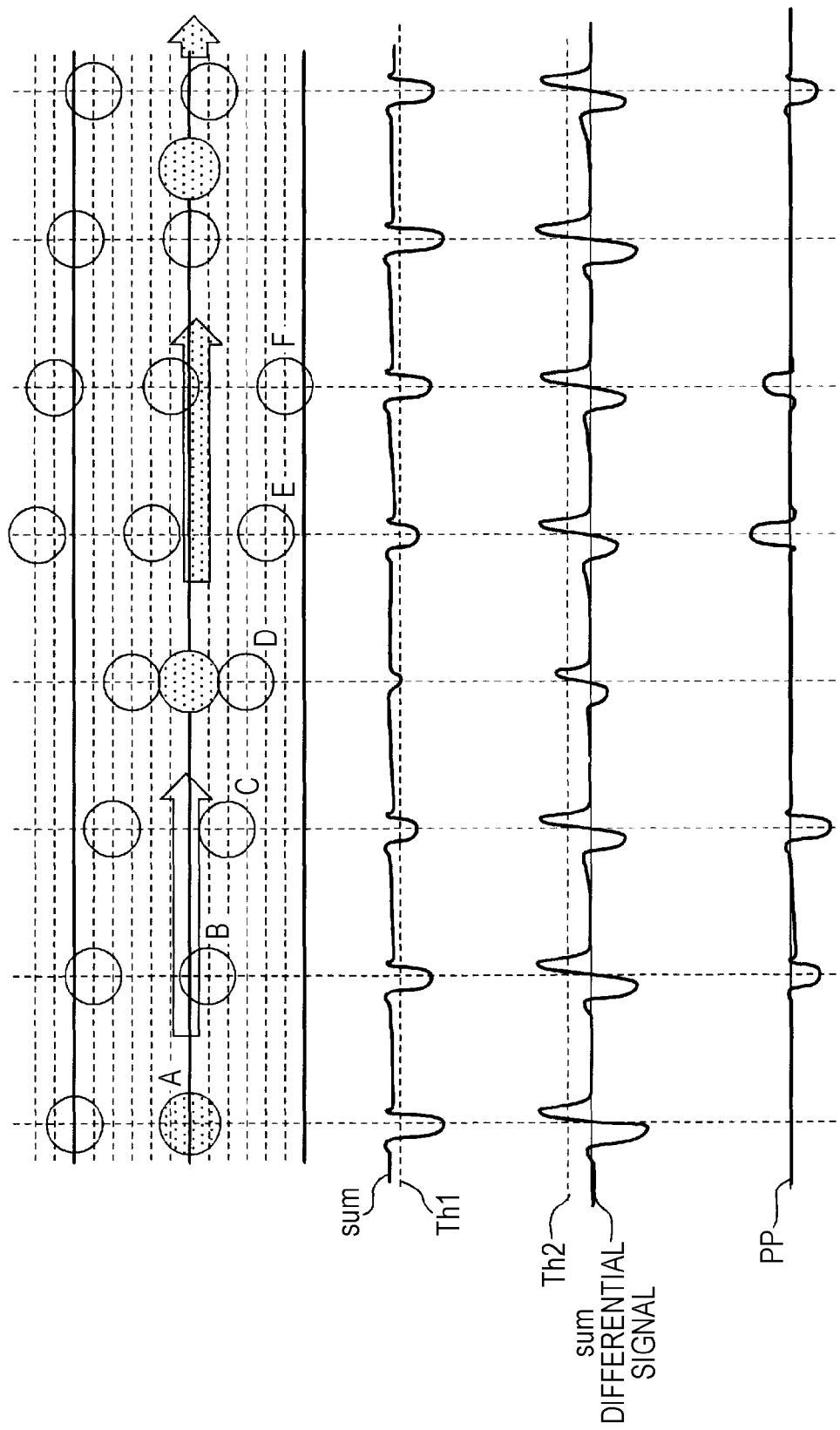

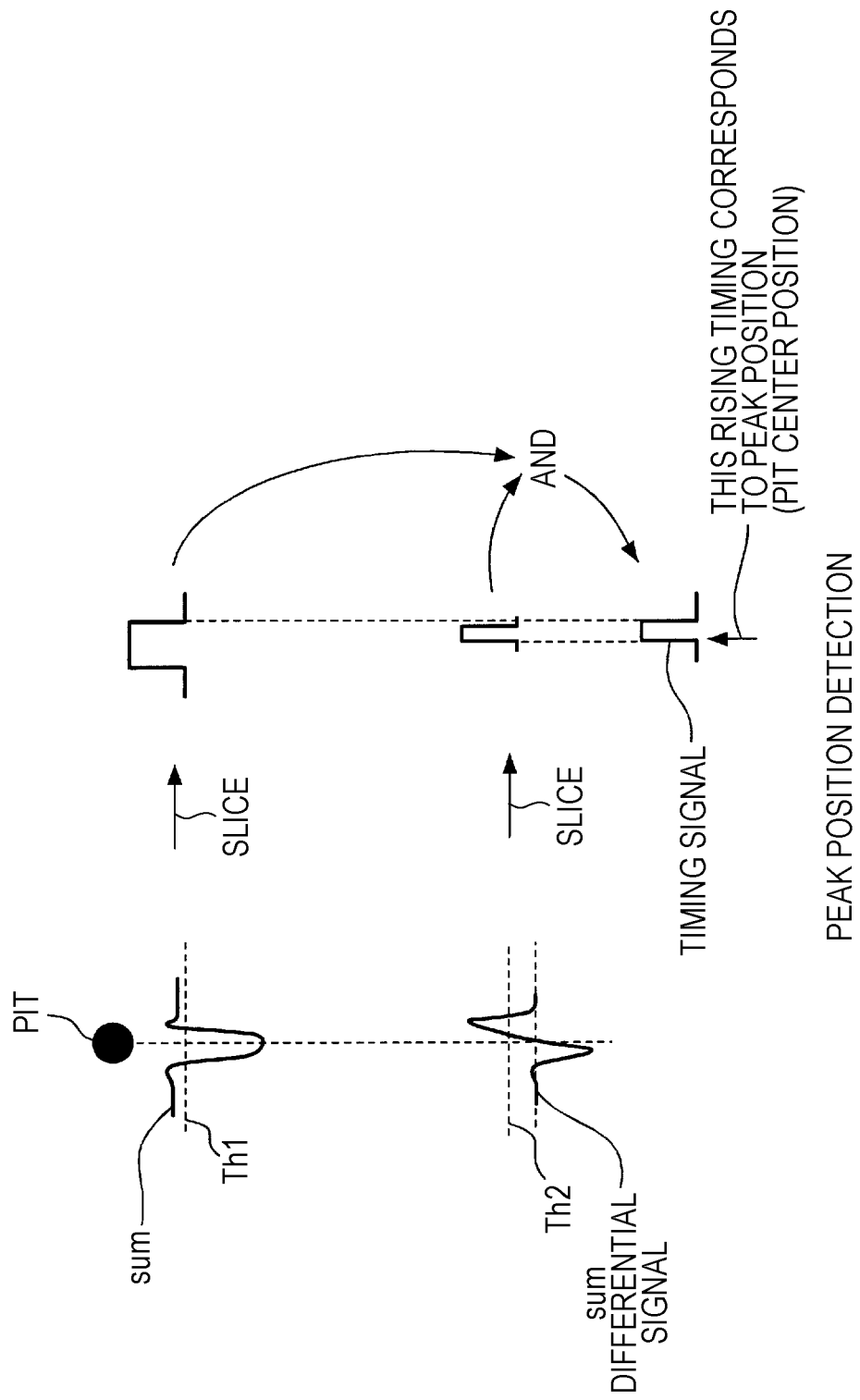

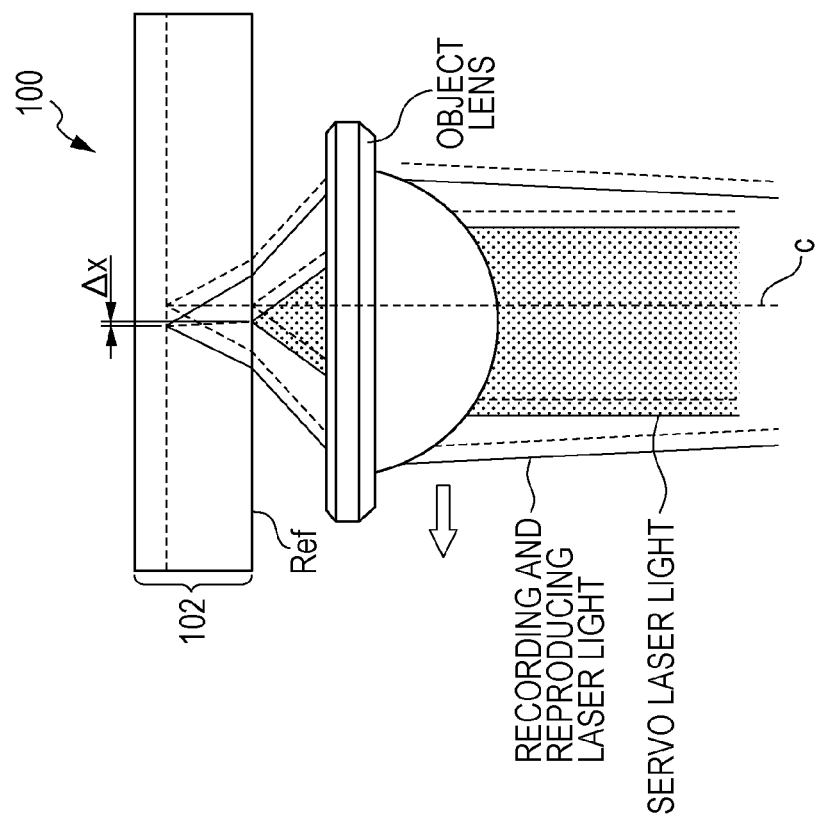
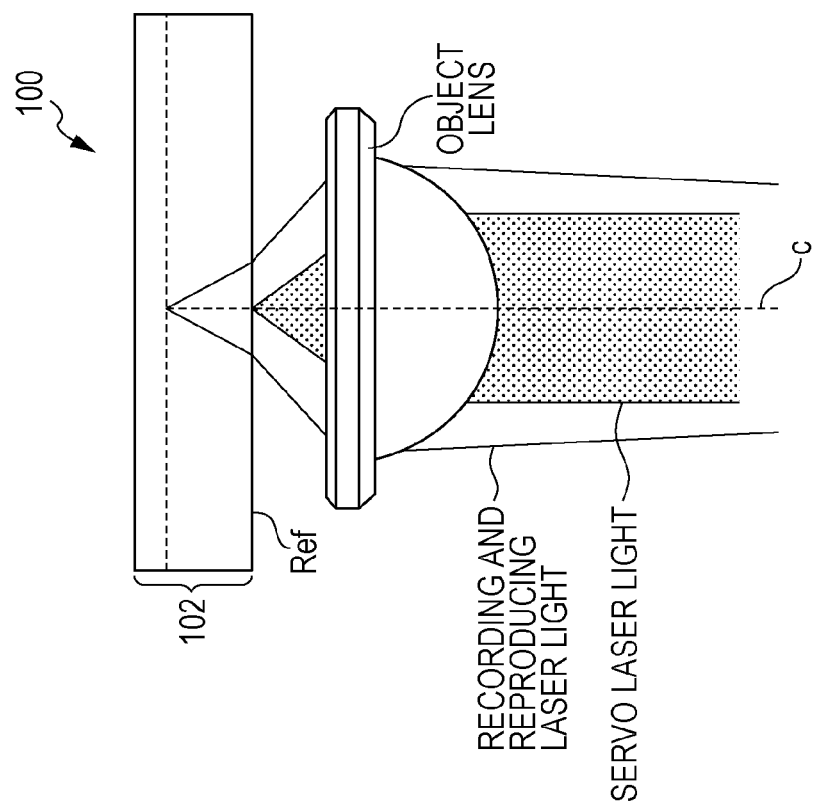

RECORDING DEVICE AND RECORDING METHOD

BACKGROUND

The present disclosure relates to a recording device that performs recording on an optical recording medium, and more particularly to a recording device configured to irradiate first light for performing mark recording and second light for performing position control on the basis of a position guide formed on the optical recording medium through a common object lens.

As an optical recording medium for recording and reproducing of signals by irradiation of light, a so-called optical disc such as CD (Compact Disc), DVD (Digital Versatile Disc), and BD (Blu-ray Disc: Registered Trademark) have come into use.

Concerning an optical recording medium taking a major role in of the next generation of the optical mediums relating to the currently widespread such as CD, DVD, and BD, the applicant proposes a so-called bulk recording type optical recording medium described in Japanese Unexamined Patent Application Publication Nos. 2008-135144 and 2008-176902.

For example, as shown in FIG. 19, bulk recording is to perform multilayer recording on a bulk layer 102 by performing laser beam irradiation while sequentially changing the focus position, an optical recording medium (a bulk type recording medium 100) having at least a cover layer 101 and a bulk layer (a recording layer) 102, which is a technique to achieve mass recording.

Concerning such bulk recording, in Japanese Unexamined Patent Application Publication No. 2008-135144, a recording technique which is a so called micro-hologram method is disclosed.

In the micro-hologram method, a so-called hologram recording material is used as a recording material of the bulk layer 102. As the hologram recording material, for example, a photopolymerization type photopolymer and the like have been widely used.

The micro-hologram method is broadly divided into two methods of a positive type micro-hologram method and a negative type micro-hologram method.

The positive type micro-hologram method is a method of condensing two opposed light fluxes (light flux A and light flux B) at the same position and forming a micro-interference pattern (hologram) to use the interference pattern as a recording mark.

As a reverse idea to the positive type micro-hologram method, the negative type micro-hologram method is a method of erasing a previously formed interference pattern by irradiation of laser to use the erased part as a recording mark. In the negative micro-hologram method, an initialization process for forming the interference pattern is performed in advance on the bulk layer 102 before a recording operation is performed. Specifically, as the initialization process, opposed light fluxes formed by parallel light are irradiated to form the interference pattern on the whole of the bulk layer 102.

After the interference pattern is formed by the initialization process as described above, information recording based on the forming of the erasure mark is performed. That is, the irradiation of laser is performed in a state of focusing on an arbitrary layer position, thereby performing the information recording based on the erasure mark.

As a method of bulk recording different from the micro-hologram method, the applicant also proposes, for example, a recording method of forming a void (vacancy or blank) disclosed in Japanese Unexamined Patent Application Publication No. 2008-176902, as a recording mark.

The void recording method is a method of performing irradiation of laser with relatively high power on the bulk layer 102 formed of a recording material such as photopolymerization type photopolymer, to record vacancy (void) in the bulk layer 102. As described in Japanese Unexamined Patent Application Publication No. 2008-176902, the vacancy part formed as described above has a refractive index different from that of the other part in the bulk layer 102, and it is possible to raise the reflexibility at such a boundary part. Accordingly, the vacancy part serves as a recording mark, and thus information recording based on the forming of the vacancy mark is realized.

Since such a void recording method is not to form the hologram, the irradiation of light from one side of recording may be performed. That is, it is not necessary to condense two light fluxes at the same position to form the recording mark in the same manner as the positive type micro-hologram method.

In comparison with the negative micro-hologram method, there is a merit in that the initialization process may not be necessary.

In Japanese Unexamined Patent Application Publication No. 2008-176902, an example of performing irradiation of pre-cure light before recording when performing the void recording is described. However, even when the irradiation of such pre-cure light may be omitted, the recording of void is possible.

The recording layer (bulk layer) of such a bulk type optical disc recording medium does not have an evident multilayer structure, for example, in meaning in which a plurality of reflection films are formed, although it is a bulk recording type (merely, referred to as bulk type) optical disc recording medium for which various recording methods are proposed as described above. That is, in the bulk layer 102, a reflection film and a guide trace for each recording layer, which a general multilayer disc has, are not provided.

Accordingly, in the state of the structure of the bulk type recording medium 100 shown in FIG. 19, focus servo or tracking servo may not be performed at the time of recording in which the mark is not formed.

For this reason, in practice, the bulk type recording medium 100 is provided with a referential reflection face (reference face) having guide traces as shown in FIG. 20.

Specifically, guide traces (position guide) are formed in a spiral shape or concentric shape, for example, by forming pits or grooves on the lower face side of the cover layer 101, and a selective reflection film 103 is formed thereon. On the lower layer side of the cover layer 102 on which the selective reflection film 103 is formed as described above, a bulk layer 102 is laminated as an intermediate layer 104 in the drawing through an adhesive material such as UV curable resin.

By forming the guide traces using the pits or grooves as described above, absolute position information (address information) such as radius position information and rotation angle information is recorded. In the following description, a face on which such guide traces are formed and the absolute position information is recorded (in this case, the forming face of the selective reflection film 103) is called "reference face Ref".

After forming the medium structure as described above, in the bulk type recording medium 100, as shown in FIG. 21, servo laser light (merely referred to as servo light) as laser light for position control is irradiated, separately from laser light (hereinafter, referred to as recording and reproducing laser light, or merely recording and reproducing light) for recording (or reproducing) a mark.

As shown, the bulk type recording medium 100 is irradiated with the recording and reproducing laser light and the servo laser light through a common object lens.

In this case, if the servo laser light reaches the bulk layer 102, there may be an adverse effect on the mark recording in the bulk layer 102. For this reason, in the bulk recording method of the related art, laser light having a wavelength band different from that of the recording and reproducing laser light is used as the servo laser light, and the selective reflection film 103 having wavelength selectivity in which the servo laser light is reflected and the recording and reproducing laser light passes is provided as a reflection film formed on the reference face Ref.

Under the above-description presupposition, an operation at the mark recording time on the bulk type recording medium 100 will be described with reference to FIG. 21.

First, when multilayer recording is performed on the bulk layer 102 on which the guide trace or the reflection film is not formed, it is predetermined where is to be the layer position for recording the mark in the depth direction in the bulk layer 102 is to be. In the drawing, as the layer position (mark forming layer position: also referred to as information recording layer position) for forming the mark in the bulk layer 102, a case of setting a total of five information recording layer positions L of a first information recording layer position L1 to a fifth information recording layer position L5 is exemplified. As shown, the first information recording layer position L1 is set as a position separated from the selective reflection film 103 (reference face Ref) on which the guide traces are formed in a focus direction (depth direction) by a first offset of-L1. The second information recording layer position L2, the third information recording layer position L3, the fourth information recording layer position L4, and the fifth information recording layer position L5 are set as positions separated from the reference face Ref by a second offset of-L2, a third offset of-L3, a fourth offset of-L4, and a fifth offset of-L5, respectively.

During recording when the mark is not yet formed, the focus servo and the tracking servo on each layer position in the bulk layer 102 based on the reflection light of the recording and reproducing laser light may not be performed. Accordingly, focus servo control and tracking servo control of the object lens during recording are performed such that a spot position of the servo laser light follows the guide traces with respect to the reference face Ref on the basis of the reflection light of the servo laser light.

However, the recording and reproducing laser light is necessary to reach the bulk layer 102 formed on the lower side than the reference face Ref to record a mark. For this reason, in the optical system in this case, a recording and reproducing light focus mechanism for independently adjusting the focus position of the recording and reproducing laser light is provided separately from the focus mechanism of the object lens.

An outline of an optical system for performing the recording and reproducing of the bulk type recording medium 100 including the mechanism for independently adjusting the focus position of the recording and reproducing laser light is shown in FIG. 22.

In FIG. 22, the object lens also shown in FIG. 21 is changeable in position in the radial direction (tracking direction) of the bulk type recording medium 100 and in the direction (focus direction) of approaching to and receding from the bulk type recording medium 100 by a 2-axis actuator as shown.

In FIG. 22, the mechanism for independently adjusting the focus position of the recording and reproducing laser light corresponds to a focus mechanism (expander) in the drawing. Specifically, the focus mechanism as the expander includes a fixed lens and a movable lens maintained to be changeable in position in a direction parallel to the optical axis of the recording and reproducing laser light by a lens driving unit. The movable lens is driven by the lens driving unit, collimation of the recording and reproducing laser light incident to the object lens in the drawing is changed, and the focus position of the recording and reproducing laser light is thereby adjusted independently from the servo laser light.

As described above, the recording and reproducing laser light and the servo laser light have different wavelength bands. Accordingly, in the optical system in this case, the reflection light of the recording and reproducing laser light and the servo laser light from the bulk type recording medium 100 is divided into each system by a dichroic prism in the drawing (i.e., each reflection light detection can be independently performed).

Considering forward light, the dichroic prism has a function of synthesizing the recording and reproducing laser light and the servo light on the same axis and inputting them to the object lens. Specifically, in this case, the recording and reproducing laser light is reflected by a mirror through the expander as shown, then is reflected by the selective reflection face of the dichroic prism, and is input to the object lens.

Meanwhile, the servo laser light passes through the selective reflection face of the dichroic prism and is input to the object lens.

FIG. 23 is a diagram illustrating servo control at the reproducing time of the bulk type recording medium 100.

When the reproducing is performed on the recording medium 100 on which the mark recording has been already performed, it is not necessary to control the position of the object lens on the basis of the reflection light of the servo laser light in the same manner as the recording time. That is, at the reproducing time, the focus servo control and tracking servo control of the object lens may be performed on the basis of the reflection light of the recording and reproducing laser light, on the mark row formed at the information recording layer position L (referred to as information recording layer L at the reproducing time) that is the reproducing target.

In the bulk recording method described above, the bulk type recording medium 100 is irradiated with the recording and reproducing laser light for mark recording and reproducing and the servo light as the position control light through the common object lens (synthesizing on the same optical axis), then, at the recording time, the focus servo control and tracking servo control of the object lens are performed such that the servo laser light follows the position guide of the reference face Ref, and the focus position of the recording and reproducing laser light are separately adjusted by the recording and reproducing focus mechanism. Accordingly, even when the position guide is not formed in the bulk layer 102, the mark recording can be performed at the necessary position (depth direction and tracking direction) in the bulk layer 102.

At the reproducing time, the focus servo control and tracking servo control of the object lens based on the reflection light of the recording and reproducing laser light are performed such that the focus position of the recording and reproducing laser light follows the already recorded mark row, and thus it is possible to perform the reproducing of the mark recorded in the bulk layer 102.

When the bulk recording method described above is employed, a spot position deviation in the inner direction of the recording face occurs between the recording and reproducing laser light and the servo laser light due to the occurrence of a so-called skew (tilt) or the occurrence of lens shift of the object lens caused by disc eccentricity.

FIG. 24A and FIG. 24B schematically show the spot position deviation between the recording and reproducing laser light and the servo laser light caused by the occurrence of the skew.

In the non-skewed state shown in FIG. 24A, the spot positions of the servo laser light and the recording and reproducing laser light coincide in the inner direction of the recording face. On the contrary, a difference in the optical axis between the servo laser light and the recording and reproducing laser light occurs according to the occurrence of the skew as shown in FIG. 24B, and a spot position deviation Δx shown in the drawing occurs.

FIG. 25A and FIG. 25B schematically show the spot position deviation between the recording and reproducing laser light and the servo laser light caused by the lens shift.

In the non-lens shift state shown in FIG. 25A, the object lens is at the reference position, and the center of the object lens and the optical axis c of each laser light incident to the object lens coincide with each other. The optical system is designed such that the spot positions in the inner direction of the recording face of each laser light coincide in the state where the object lens is at the reference position as described above.

On the contrary, when the object lens is shifted from the reference position to follow the disc eccentricity as shown in FIG. 25B by the tracking servo control (in this case, shifted to the left on paper), the spot position deviation Δx shown in the drawing occurs.

The spot position deviation caused by the lens shift occurs due to the difference in the incidence shapes of the servo laser light and the recording and reproducing laser light with respect to the object lens. Specifically, it is because the servo laser light is incident to the object lens by substantially parallel light, and the recording and reproducing laser light is incident by unparallel light.

According to the occurrence of the spot position deviation in the servo laser light and the recording and reproducing laser light caused by the skew or lens shift, difference in the information recording position in the bulk layer 102 occurs. That is, as can be understood from the above description, the spot position of the recording and reproducing laser light during recording is controlled by performing the tracking servo control of the object lens based on the reflection light of the servo laser light, and thus the recording may not be performed at the intended position in the bulk layer 102 according to the spot position deviation described above.

The information recording positions may be overlapped between the adjacent tracks according to the setting of the amount of skew eccentricity or track pitches (intervals of formation position guides). Specifically, the disc eccentricity or skew is due to the manner in which the disc is clamped to the spindle motor and may occur in different manners whenever the disc is loaded. Accordingly, for example, if rewriting based on disc shifting is performed on the disc, the shape of the skew eccentricity occurring at the previous recording time and the shape of the skew eccentricity occurring at the rewriting time are different. As a result, there is a problem that an overlap between the mark row of the recorded part and the mark row of the rewriting part occurs or they intersect with each other according to the case.

As described above, it is difficult to rightly reproduce the reproducing signal.

As one method for preventing the overlap of the mark rows or the intersection from occurring, the track pitches may be set wide on the reference face Ref.

However, when the track pitches of the reference face Ref are widened, obviously, the recording capacity in the bulk layer 102 is reduced.

Examples of the related art are disclosed in Japanese Unexamined Patent Application Publication Nos. 2009-9635, 2009-140568, and 2009-163811.

As one method for preventing the reduction of the recording capacity of the bulk layer 102 while preventing the overlap of the recording mark rows or the intersection caused by the skew or lens shift described above from occurring, there is a so-called self-tracking method.

The self-tracking is a technique for preventing the overlap or intersection of the recording mark rows on the recording layer on which the position guide is not formed, in which a side beam is generated and irradiated at a position that is an inner circumferential side with a light beam taking in charge of recording, and tracking servo is started with the side beam on the recorded mark row to continue recording after the first cycle recording such that the mark forming intervals of the marks with respect to the mark rows on which the recording is completed for the later cycle are kept at the interval between the recording beam spot and the side spot, thereby preventing the overlap or intersection of the mark rows from occurring.

FIG. 26A and FIG. 26B are diagrams illustrating a specific recording operation when such a self-tracking method is applied to bulk recording.

In the drawing, a spot S-sv&S-rpM based on a patterned circle indicates a spot S-sv of servo laser light and a main beam spot (recording beam spot) S-rpM of the recording and reproducing laser light. As described above, since the servo laser light and the recording and reproducing laser light are irradiated such that the optical axes thereof coincide, it may be indicated that the spot S-sv and the spot S-rpM overlap with each other in a direction parallel to the inner direction of the recording face (when the skew or lens shift does not occur).

The spot S-rpS shown by the white circle becomes the side beam spot generated using, for example, grating or the like, with respect to the recording and reproducing laser light.

The broken line in the drawing indicates a track (guide trace) formed on the reference face Ref.

FIG. 26A schematically shows a shape when the first cycle recording is performed.

In the first cycle recording, recording of the mark row based on the main beam spot S-rpM is performed while performing the tracking servo of the servo laser light on the track formed on the reference face Ref.

In the drawing, the track (broken line) on the reference face Ref and the actually recorded mark row (solid line) do not coincide. This is because it indicates that a spot position deviation occurs by the skew or lens shift occurs.

When the recording of one cycle track is performed as described above, the side beam spot S-rpS is positioned in the vicinity of the recorded mark row (mark row of the first cycle start position), in the vicinity of the first cycle completion position as shown in FIG. 26B.

The amount of occurrence of a bending state or disc eccentricity is equivalent when the radius position on the disc or the rotation angle position is equivalent. Accordingly, from this point, the side beam spot S-rpS is positioned in the vicinity of the recorded mark row of the first cycle as described above at the completion time of the recording of the first cycle.

In the vicinity of the recording completion of the first cycle, drawing-in of the tracking servo with respect to the mark row on which the first cycle recording is completed by the side beam spot S-rpS is performed, and the tracking servo of the object lens is thereby switched from the tracking servo based on the beam spot S-sv of the general servo laser light to the tracking servo using the side beam spot S-rpS.

Accordingly, the mark rows of the second cycle or later are formed at positions getting far away by a distance between the main beam spot S-rpM and the side beam spot S-rpS with respect to the recorded mark row formed on the inner circumferential side thereof, to prevent the overlap or intersection of the mark rows from occurring.

When the self-tracking method as described above is used, it is important that the amount of deviation in the position of the information recording layer when the first cycle recording is completed is substantially the same in the first cycle and the second cycle.

As described above, the amount of occurrence of the bending state or the disc eccentricity is substantially equivalent when the radius position on the disc or the rotation angle is substantially the same. Accordingly, generally, it is difficult to think that the difference in the information recording positions of the first cycle and the second cycle gets larger at the completion time of the first cycle recording.

However, in practice, the difference in the positions between the servo laser light and the recording and reproducing laser light does not occur according to only the eccentricity or the bending state of the disc, but occurs also due to the occurrence of deterioration of a slide mechanism sliding the whole of an optical pickup or occurrence of disturbance.

When a relatively large difference in the spot position caused by the deterioration of the slide mechanism or the disturbance occurs in the vicinity of the recording completion time point of the first cycle, the recording mark row of the second cycle may greatly deviate from the recorded mark row to the outer circumferential side at the recording completion time of the first cycle as shown in FIG. 27A, or, on the contrary, the overlap with the recorded mark row may occur as shown in FIG. 27B.

Even in any case of FIG. 27A and FIG. 27B, it is difficult to perform the drawing-in of the tracking servo on the recorded mark row of the first cycle by the side beam spot S-rpS in the vicinity of the recording completion of the first cycle. As a result, it is difficult to perform the switching to the recording based on the self-tracking.

SUMMARY

It is desirable to achieve both of preventing overlap or intersection of mark rows from occurring and preventing a recording capacity from being reduced by appropriately performing the recording based on the self-tracking in the recording layer even when a deviation in a spot position caused by deterioration of a thread mechanism or disturbance occurs, when the recording is performed by irradiation of a first light beam for mark recording and a second light beam for performing servo control according to a position guide through a common object lens, on an optical disc recording medium having a reference face having a reflection film on which the position guide is formed, and a recording layer which is formed at a position of a depth different from that of the reference face and is to perform information recording by forming a mark according to light irradiation.

According to an embodiment of the present disclosure, a recording device is configured as follows.

The recording device of the embodiment performs recording on an optical disc recording medium which includes a reference face having a reflection film provided with a position guide, and a recording layer provided at a position of a depth different from that of the reference face and performing information recording by mark forming according to irradiation of light.

The recording device includes a light generating and irradiating unit that generates a first light beam for performing information recording on the recording layer, a second light beam for performing position control based on the position guide formed on the reference face, and a third light beam, and is provided with an object lens to which the first, second, and third light beams are incident. In that case, an irradiation spot of the third light beam is positioned on the side of the reverse direction to a recording direction with respect to irradiation spot positions of the first and second light beams when a progress direction of the recording is the recording direction with respect to a radial direction of the optical disc recording medium. The first, second, and third light beams are irradiated such that the first light beam and the third light beam are focused on the recording layer and the second light beam is focused on the reference face.

The recording device includes a recording unit that performs light emitting driving control for the first light beam to perform mark recording on the recording layer.

The recording device includes a tracking mechanism that drives the object lens in a tracking direction that is a direction parallel to a radial direction of the optical disc recording medium.

The recording device includes a first tracking error signal generating unit that generates a first tracking error signal on the basis of a result of receiving reflection light of the second light beam from the reference face.

The recording device includes a second tracking error signal generating unit that generates a second tracking error signal on the basis of a result of receiving reflection light of the third light beam from the recording layer.

The recording device includes a tracking servo control unit that performs tracking servo control on the object lens by driving the tracking mechanism on the basis of the first or second tracking error signal.

The recording device includes a control unit that controls the recording unit to start the mark recording in a state where the tracking servo control based on the first tracking error signal is performed by the tracking servo control unit, and to start applying a forward direction offset for gradually shifting an irradiation spot position of the second light beam in the recording direction on a tracking servo loop based on the first tracking error signal, starts applying a reverse direction offset for gradually shifting an irradiation spot of the second light beam in the reverse direction to the recording direction on the tracking servo loop at the timing of the vicinity of a completion position of the mark recording of one cycle of a disc, monitors the second tracking error signal under the application of the reverse direction offset, and controls the tracking servo control performed by the tracking servo control unit to be switched to tracking servo control based on the second tracking error signal according to detection of a change point represented by an irradiation spot of the third light beam positioned in the vicinity of the mark row for which the first cycle recording is completed, with respect to the second tracking error signal.

In the embodiment as described above, at the time of mark recording of the first one cycle on the recording layer, the forward direction offset is applied to shift the irradiation spot (further the object lens) of the second light beam in the recording direction, thereby shunting the mark recording completion position of the first cycle in the recording direction. Accordingly, even when a relatively large spot position deviation occurs due to deterioration of the slide mechanism or disturbance in the vicinity of the recording completion of the first cycle, it is possible to prevent the overlap or intersection of the mark rows of the first cycle and the second cycle from occurring.

After the shunting, the reverse direction offset is applied to shift the irradiation spot (object lens) of the second light beam in the reverse direction to the recording direction. When the irradiation spot is shifted in the reverse direction to the recording direction as described above, the irradiation spot of the third light beam is positioned in the vicinity of the mark row on which the first cycle recording is completed, and a change point is thereby observed on the second tracking error signal. In the embodiment, the tracking servo control of the object lens is switched to the tracking servo control based on the third tracking error signal according to the detection of the change point of the second tracking error signal.

Accordingly, the mark recording is performed under the performing of the tracking servo on the mark row on which the recording based on the third light is completed. That is, it is performed under so-called self-tracking. By performing the recording based on the self-tracking, the overlap or intersection of the mark rows thereafter is prevented from occurring. In addition, since it is the self-tracking, the recording capacity in the recording layer is prevented from being reduced.

According to the present disclosure as described above, in the optical disc recording medium which includes the reference face having the reflection film provided with the position guide, and the recording layer formed at the position of the depth different from that of the reference face and performing information recording by the mark forming according to the irradiation of light, when the first light beam for the mark recording and the second light beam for performing the servo control according to the position guide are irradiated through the common object lens to perform the recording, it is possible to appropriately perform the recording based on the self-tracking in the recording layer even when a difference in a spot position caused by deterioration of a thread mechanism or disturbance occurs.

When the mark recording based on the self-tracking can be performed as described above, it is possible to prevent the overlap or intersection of the marks on the recording layer from occurring. According to the self-tracking, the forming pitches of the mark row on the recording layer can be filled, and thus it is possible to prevent the recording capacity from being reduced in the recording layer.

As a result, according to the present disclosure, it is possible to achieve both of preventing the overlap or intersection of the mark rows from occurring and preventing the recording capacity in the recording layer from being reduced.

BRIEF DESCRIPTION OF THE DRAWINGS

FIG. 6A, FIG. 6B, and FIG. 6C are diagrams illustrating an address information format.

FIG. 7 is a diagram schematically illustrating movement of a spot of servo laser light on the reference face due to rotation of the recording medium, and relation of waveforms of a sum signal, a sum differential signal, and a PP (push-pull) signal, which are obtainable at that time.

FIG. 8 is a diagram illustrating a timing signal generated on the basis of the sum differential signal and the sum signal when generating of a clock.

FIG. 25A and FIG. 25B are diagrams schematically illustrating a spot position deviation between recording and reproducing laser light and servo laser light caused by lens shift.

DETAILED DESCRIPTION OF EMBODIMENTS

Hereinafter, preferred embodiment (hereinafter, referred to as embodiments) for carrying out the present disclosure will be described.

The description thereof will be performed in the following order.

1. Recording Medium and Optical System 1-1. Cross-sectional Structure of Optical Disc Recording Medium as Recording and Reproducing Target in Embodiment 1-2. Configuration of Optical System
2. Variable Track Pitch Format
2-1. Structure of Reference Face
2-2. Address Information
2-3. Specific Method of Tracking Servo
3. Overall Inner Configuration of Recording Device
4. Recording Method of Embodiment
5. Process Sequence
6. Modified Example

Figure 1:
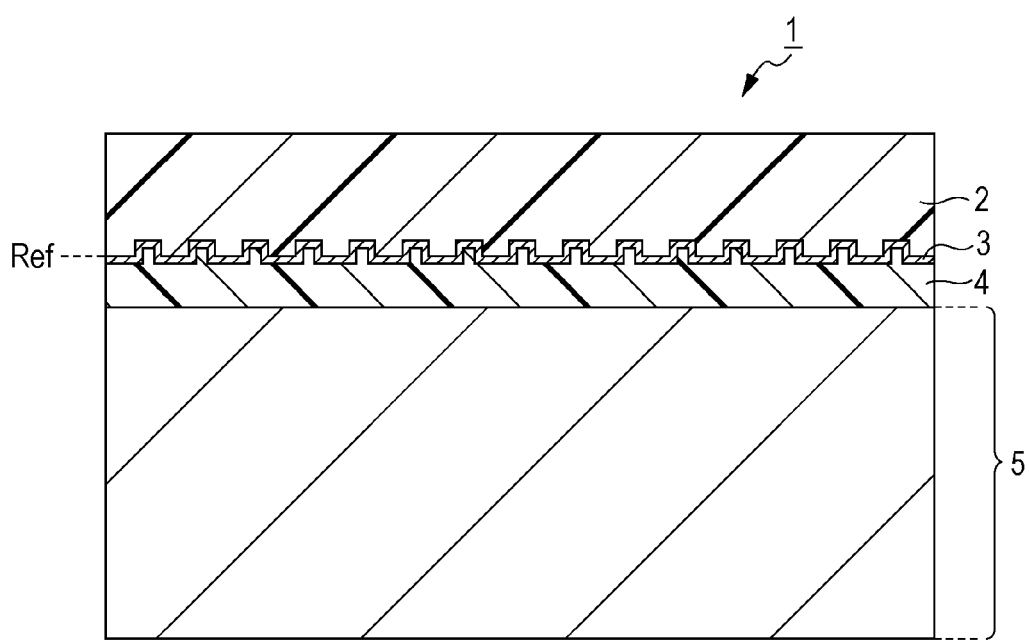
FIG. 1 is a cross-sectional structural view of an optical disc recording medium as a recording and reproducing target according to an embodiment.

1. Recording Medium and Optical System 1-1. Cross-sectional Structure of Optical Disc Recording Medium as Recording and Reproducing Target in Embodiment FIG. 1 shows a cross-sectional structural diagram of an optical disc recording medium as a recording and reproducing target according to an embodiment.

The optical disc recording medium as the recording and reproducing target according to the embodiment is a so-called bulk recording type optical recording medium, and is hereinafter referred to as a bulk type recording medium 1.

The bulk type recording medium 1 is a disc-shaped optical recording medium, and mark recording (information recording) is performed by irradiation of laser light on the bulk type recording medium 1 driven to rotate. Reproducing of recording information is also performed by irradiation of laser light on the bulk type recording medium 1 driven to rotate.

The optical recording medium is a general term of a recording medium that records and reproduces information by irradiation of light.

As shown in FIG. 1, the bulk type recording medium 1 is provided with a cover layer 2, a selective reflection film 3, an intermediate layer 4, and a bulk layer 5, in order from the upper layer side.

In the present specification, "upper layer side" indicates an upper layer side when an incident face of laser light from a recording device (a recording and reproducing device 10 to be described later) side as an embodiment to be described later is an upper face.

In the present specification, "depth direction" is used, the "depth direction" indicates a direction coinciding with an up and down direction based on the definition of the "upper layer side" (i.e., a parallel direction to an incident direction of laser light from the recording device side: focus direction).

In the bulk type recording medium 1, the cover layer 2 is formed of resin such as polycarbonate or acryl, and pit rows to be described later as position guides for guiding a recording and reproducing position are formed on the side thereunder as shown, thereby forming a convex and concave cross-sectional shape. The cover layer 2 is generated by injection molding using a stamper provided with pit rows.

A specified formed shape of the pit rows in the bulk type recording medium 1 as the embodiment will be described later.

The selective reflection film 3 is formed on the side of the lower face of the cover layer 2 provided with the pit rows.

In the bulk recording method as described above, light (servo laser light) to obtain an error signal of tracking or focus on the basis of the position guide such as the pit rows is irradiated separately from light (recording and reproducing laser light) for performing the mark recording and reproducing on the bulk layer 5 as the recording layer.

In this case, if the servo laser light reaches the bulk layer 5, there may be an adverse effect on the mark recording in the bulk layer 5. For this reason, a reflection film having selectivity of reflecting the servo laser light and passing the recording and reproducing laser light is necessary.

In the related art, laser light having different wavelength bands is used for the recording and reproducing laser light and the servo laser light as the bulk recording method, and thus a selective reflection film having wavelength selectivity of reflecting light with the same wavelength band as the servo laser light and passing light with the other wavelengths is used as the selective reflection film 3.

The bulk layer 5 as the recording layer is laminated (adhered) onto the side of the lower layer of the selective reflection film 3 through the intermediate layer 4 formed of an adhesive material such as UV curable resin.

As a forming material (recording material) of the bulk layer 5, an appropriate optimal material may be employed according to an employed bulk recording method, for example, the above-described, positive type micro-hologram method, negative type micro-hologram method, and void recording method.

The mark recording method on the optical disc recording medium that is the target of the present disclosure is not particularly limited, and an arbitrary method within the scope of the bulk recording method may be employed. As an example in the following description, a case of employing the void recording method is exemplified.

In the bulk type recording medium 1 having the cross-sectional structure as described above, the selective reflection film 3 provided with the position guides may be a reflection face that is reference in performing position control of the recording and reproducing laser light based on the servo laser light to be described later. As this meaning, a face provided with the selective reflection film 3 is hereinafter referred to as a reference face Ref.

Figure 21:
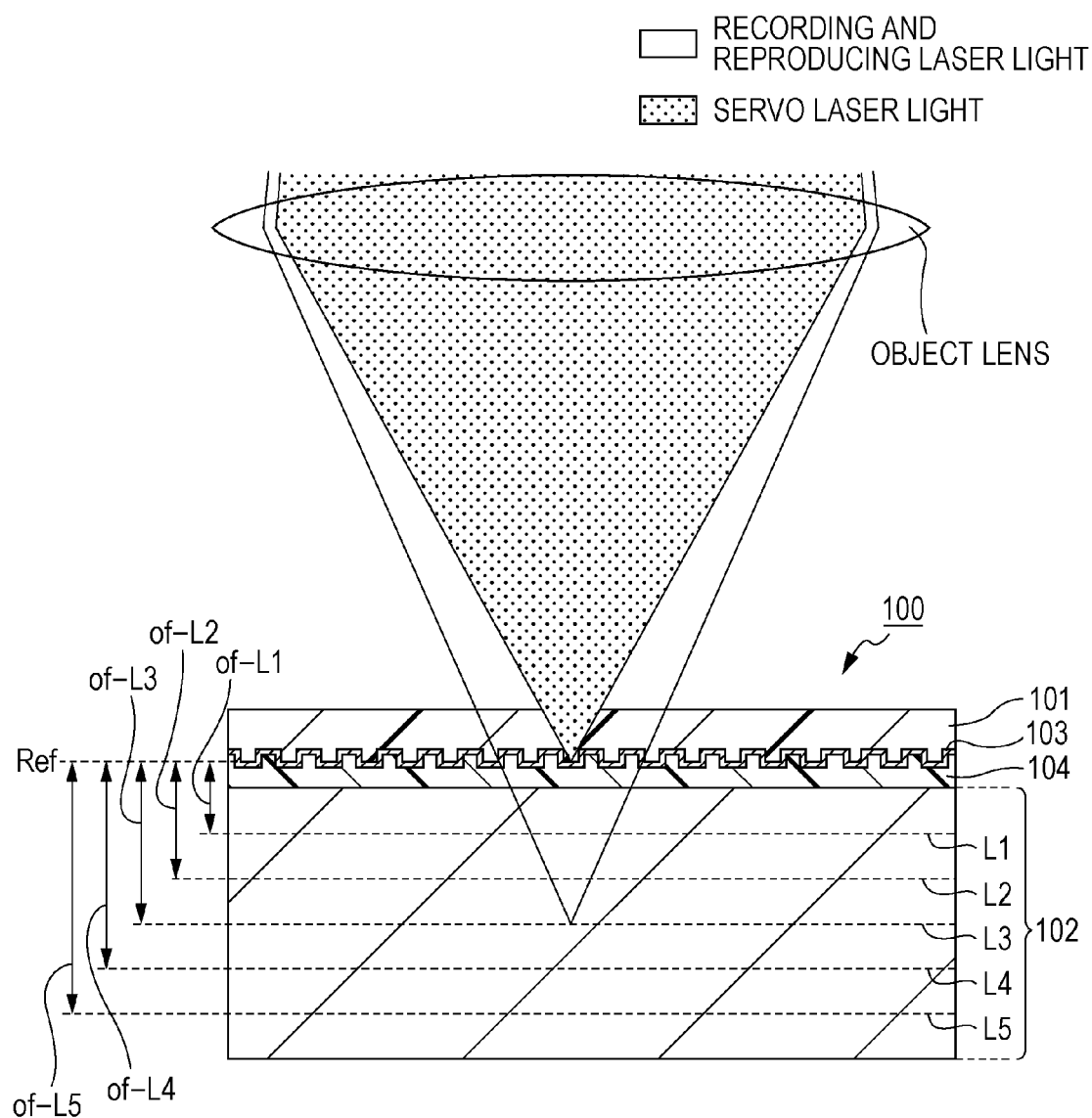
FIG. 21 is a diagram illustrating an operation at the time of mark recording onto a bulk type recording medium.

As described in FIG. 21, in the bulk type optical recording medium, each layer position (information recording layer position L) for performing information recording in advance is set to perform multilayer recording in the bulk layer. In the bulk type recording medium 1, in the information recording layer position L, a first information recording layer position L1, a second information recording layer position L2, a third information recording layer position L3, a fourth information recording layer position L4, and a fifth information recording layer position L5 separated in the depth direction from the reference face Ref in the same manner as the case of FIG. 21 by a first offset of-L1, a second offset of-L2, a third offset of-L3, a fourth offset of-L4, and a fifth offset of-L5 are set.

Information of the offset set of-L of each layer position L from the reference face Ref is set by a controller 40 of a recording and reproducing device 10 to be described later.

In the bulk layer 5, the recording direction of information in each information recording layer position L may be the same or different. That is, the recording direction may be alternately changed whenever passing a layer as be used as so-called opposite track pass, and the recording direction in each layer may be aligned in the same direction like parallel track pass.

Hereinafter, for convenience of description, it is assumed that the parallel track pass is employed as the recording direction.

Specifically, in each layer position L, the recording direction may be aligned such as from inner circumference to outer circumference.

For confirmation, herein, the "recording direction" is a direction in which the recording proceeds in the disc radial direction.

1-2. Configuration of Optical System

Figure 2:
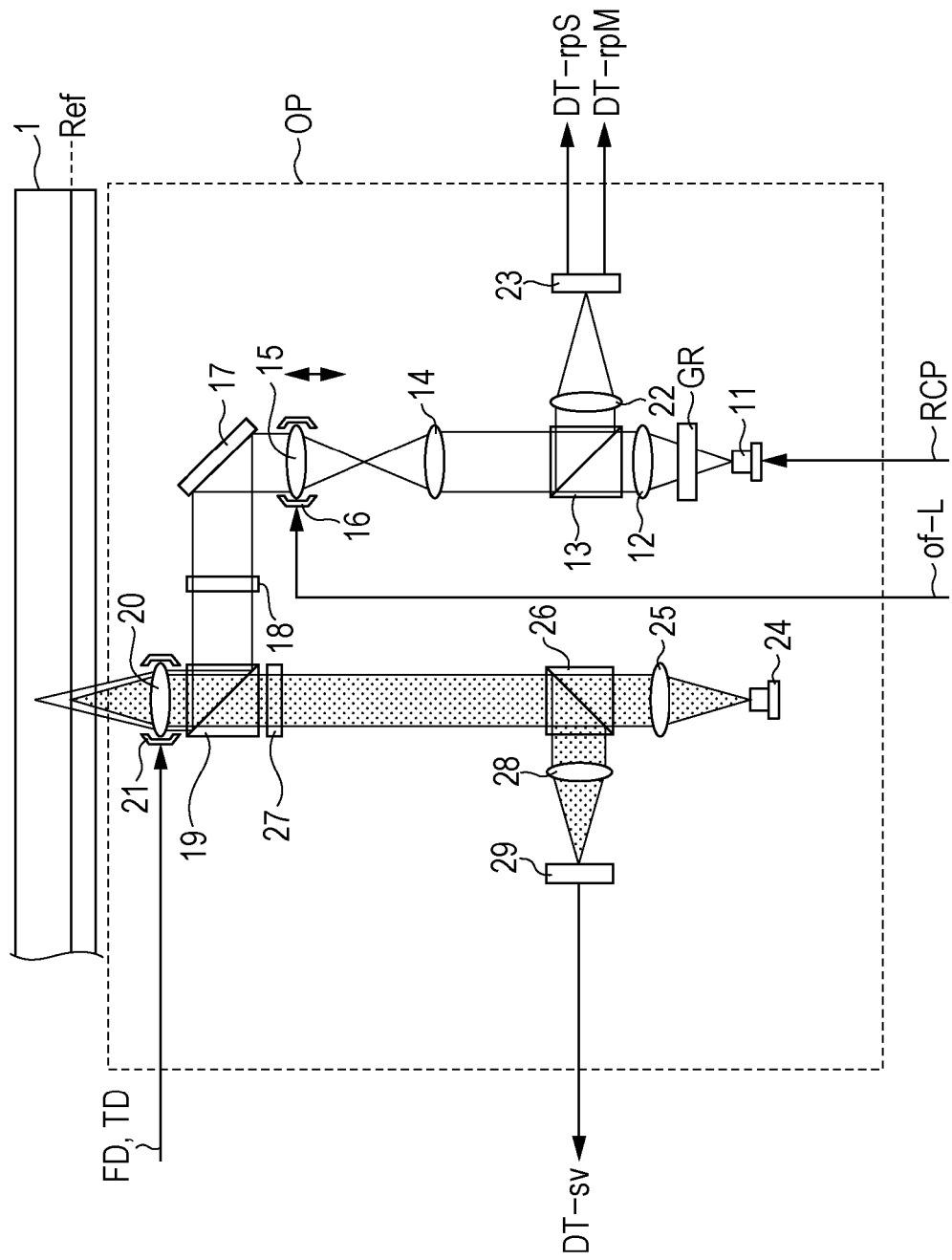
FIG. 2 is a diagram mainly illustrating a configuration of an optical system of a recording device of the embodiment.

FIG. 2 is a diagram for mainly explaining the optical system of the recording device (referred to as a recording and reproducing device 10) as the embodiment of performing the recording and reproducing on the bulk type recording medium 1 having the cross-sectional structure as shown in FIG. 1. Specifically, an inner configuration of an optical pickup OP of the recording and reproducing device 10 of the embodiment is shown.

In FIG. 2, the bulk type recording medium 1 loaded on the recording and reproducing device 10 is set to clamp the center hole thereof at a predetermined position in the recording and reproducing device 10, and is maintained with the bulk type recording medium 1 being rotatable by a spindle motor (not shown).

The optical pickup OP is provided to irradiate the bulk type recording medium 1 rotated by the spindle motor with recording and reproducing laser light, servo laser light, and side beam necessary to realize self-tracking to be described later.

The optical pickup OP is provided therein with a recording and reproducing laser 11 that is a light source of laser light for performing information recording based on the mark and reproducing of information recorded by the mark, and a servo laser 24 that is a light source of the servo laser light for performing the position control using the position guides formed on the reference face Ref.

Herein, as described above, the recording and reproducing laser light and the servo laser light have different wavelengths. In the case of this example, the wavelength of the recording and reproducing laser light is about 405 nm (so-called blue and violet laser light), and the wavelength of the servo laser light is about 650 nm (red laser light).

The optical pickup OP is provided therein with the object lens 20 that is an output terminal of the recording and reproducing laser light and the servo laser light to the bulk type recording medium 1.

A recording and reproducing light receiving unit 23 for receiving reflection light of the recording and reproducing laser light from the bulk type recording medium 1, and a servo light receiving unit 29 for receiving reflection light of the servo laser light from the bulk type recording medium 1 are provided.

The optical pickup OP is provided therein with an optical system for leading the recording and reproducing laser light output from the recording and reproducing laser 11, to the object lens 20 and leading the reflection light of the recording and reproducing laser light input from the bulk type recording medium 1 to the object lens 20, to the recording and reproducing light receiving unit 23.

First, the recording and reproducing laser light output from the recording and reproducing laser 11 passes through a grating GR to be divided into a plurality of beams by diffraction.

A 0-order optical component of the grating GR is referred to as a main beam, and ±1-order optical components are referred to as side beams. In the side beams, on the basis of the irradiation position of the main beam of the bulk type recording medium 1, a side beam irradiated on the inner circumferential side is an inner circumferential side beam, and a side beam irradiated on the outer circumferential side is an outer circumferential side beam.

The recording and reproducing laser light passing through the grating GR becomes parallel light through a collimation lens 12, and then is input to a polarization beam splitter 13. The polarization beam splitter 13 allows the recording and reproducing laser light input from the recording and reproducing laser 11 side as described above to pass.

The recording and reproducing laser light passing through the polarization beam splitter 13 is input to an expander formed of a fixed lens 14, a movable lens 15, and a lens driving unit 16. The side of the expander close to the recording and reproducing laser 11 as the light source is considered as the fixed lens 14, the movable lens 15 is provided on the far side from the recording and reproducing laser 11, and the movable lens 15 is driven in a direction parallel to the optical axis of the recording and reproducing laser light by the lens driving unit 16, to perform independent focus control on the recording and reproducing laser light. The expander corresponds to the recording and reproducing light focus mechanism described above (see FIG. 22).

As will be described later, the lens driving unit 16 in the recording and reproducing focus mechanism is driven according to the value of the offset of-L set corresponding to the information recording layer position L that is the target by the controller 40 shown in FIG. 10.

The recording and reproducing laser light passing through the fixed lens 14 and the movable lens 15 constituting the recording and reproducing focus mechanism is reflected by a mirror 17 as shown in the drawing, and then is input to a dichroic prism 19 through a ¼ wavelength plate 18.

In the dichroic prism 19, the selective reflection face reflects light in the same wavelength band as that of the recording and reproducing laser light and allows light with the other wavelengths to pass. Accordingly, the recording and reproducing laser light input as described above is reflected from the dichroic prism 19.

The recording and reproducing laser light reflected from the dichroic prism 19 is irradiated to the bulk type recording medium 1 through the object lens 20 as shown.

The object lens 20 is provided with a 2-axis actuator 21 maintaining the object lens 20 to be changeable in position in the focus direction (direction approaching to and receding from the bulk type recording medium 1) and a tracking direction (direction perpendicular to the focus direction: radial direction of the bulk type recording medium 1).

The 2-axis actuator 21 is provided with a focus coil and a tracking coil, to which driving signals (driving signals FD and TD to be described later) are given, respectively, thereby changing the position of the object lens 20 in the focus direction and tracking direction.

At the reproducing time, the bulk type recording medium 1 is irradiated with the recording and reproducing laser light as described above, and thus the reflection light of the recording and reproducing laser light can be obtained from the bulk type recording medium 1 (the mark row recorded in the information recording layer L that is the reproducing target in the bulk layer 5). The reflection light of the recording and reproducing laser light obtainable as described above is led to the dichroic prism 19 through the object lens 20 and is reflected from the dichroic prism 19.

The reflection light of the recording and reproducing laser light reflected from the dichroic prism 19 passes through the ¼ wavelength plate 18, the mirror 17, and the recording and reproducing focus mechanism (from the movable lens 15 to the fixed lens 14), and then is input to the polarization beam splitter 13.

The polarization direction of the reflection light (backward light) of the recording and reproducing laser light input to the polarization beam splitter 13 as described above is changed by 90° from the recording and reproducing laser light (forward light) input from the recording and reproducing laser light 11 side to the polarization beam splitter 13 by the action of the ¼ wavelength plate 18 and the action during reflection in the bulk type recording medium 1. As a result, the reflection light of the recording and reproducing laser light input as described above is reflected from the polarization beam splitter 13.

The reflection light of the recording and reproducing laser light reflected from the polarization beam splitter 13 as described above is condensed on the light receiving face of the recording and reproducing light receiving unit 23 through a condensing lens 22.

Figure 3:
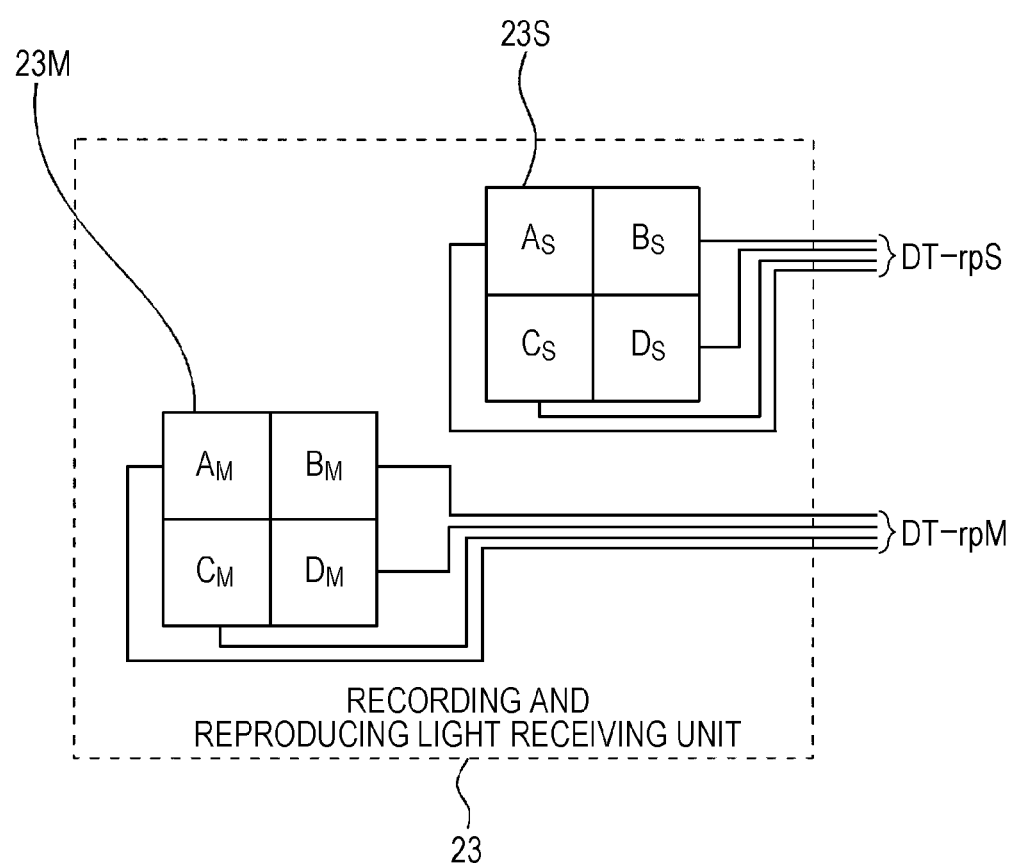
FIG. 3 is a diagram illustrating an inner configuration of a recording and reproducing light receiving unit.

FIG. 3 shows an inner configuration of the recording and reproducing light receiving unit 23 shown in FIG. 2.

As shown in FIG. 3, the recording and reproducing light receiving unit 23 is provided with a main beam detector 23M and a side beam detector 23S.

The main beam detector 23M is provided at a position capable of receiving the reflection light of the main beam. In this example, the side beam detector 23S is provided at a position capable of receiving the inner circumferential side beam between the inner circumferential side beam and the outer circumferential side beam.

In this example, both of the main beam detector 23M and the side beam detector 23S are 4-division detectors. As shown, the four light receiving elements of the main beam detector 23M are represented by light receiving elements $A_M$, $B_M$, $C_M$, and $D_M$, and light receiving elements of the side beam detector 23S are represented by light receiving elements $A_S$, $B_S$, $C_S$, and $D_S$.

Hereinafter, a general term of light receiving signals obtainable by the light receiving elements $A_M$, $B_M$, $C_M$, and $D_M$ of the main beam detector 23M is a light receiving signal DT-rpM. As described above, a general term of light receiving signals obtainable by the light receiving elements $A_S$, $B_S$, $C_S$, and $D_S$ of the side beam detector 23S is a light receiving signal DT-rpS.

The description is returned to FIG. 2.

The optical pickup OP is provided therein with an optical system for leading the servo laser light output from the servo laser 24, to the object lens 20, and leading the reflection light of the servo laser light from the bulk type recording medium 1 input to the object lens 20, to the servo light receiving unit 29.

As shown, the servo laser light output from the servo laser 24 becomes parallel light through a collimation lens 25, and then is input to a polarization beam splitter 26. The polarization beam splitter 26 allows the servo laser light (forward light) input from the servo laser 24 side as described above to pass.

The servo laser light passing through the polarization beam splitter 26 is input to the dichroic prism 19 through a ¼ wavelength plate 27.

As described above, since the dichroic prism 19 reflects light in the same wavelength band as that of the recording and reproducing laser light and allows light with the other wavelengths to pass, the servo laser light passes through the dichroic prism 19 and is irradiated to the bulk type recording medium 1 through the object lens 20.

The reflection light (the reflection light from the reference face Ref) of the servo laser light obtainable by the irradiation of the servo laser light to the bulk recording medium 1 as described above passes through the dichroic prism 19 through the object lens 20 and is input to the polarization beam splitter 26 through the ¼ wavelength plate 27.

In the same manner as the case of the recording and reproducing laser light, the polarization direction of the reflection light (backward light) of the servo laser light input from the bulk type recording medium 1 side as described above is different from the that of the forward light by 90° due to the action of the ¼ wavelength plate 27 and action at the reflecting time in the bulk type recording medium 1, and thus the reflection light of the servo laser light as the backward light is reflected from the polarization beam splitter 26.

The reflection light of the servo laser light reflected from the polarization beam splitter 26 is condensed on the light receiving face of the servo light receiving unit 29 through the condensing lens 28.

Although not described in the drawing, in practice, the recording and reproducing device 10 is provided with a slide driving unit which drives the whole of the optical pickup OP described above to slide in the tracking direction, and the irradiation position of the laser light can be widely changed by driving the optical pickup OP driven by the slide driving unit.

2. Variable Track Pitch Format 2-1. Structure of Reference Face

In the recording method as an embodiment to be described below, an operation of gradually shifting the recording position based on the recording and reproducing laser light to the outer circumferential side (the recording direction side) or the inner circumferential side (the reverse direction side to the recording direction) is performed.

The operation of gradually shifting the recording position can be realized by giving an offset of increasing and decreasing a value thereof with the lapse of time in the servo loop under the tracking servo control of the object lens 20 according to the position guide of the reference face Ref based on the servo laser light.

However, when the method of merely applying the offset to the servo loop is employed, there is a problem that the tracking servo deviates when the amount of offset is over ½ the track pitch. When the tracking servo deviates, it is difficult to accurately control the recording position, and it is difficult to accurately control the amount of offset of the recording position.

Considering such a problem, in this example, the application of an offset over ½ the track pitch can be stably performed using a structure described hereinafter as the structure of the reference face Ref of the bulk type recording medium 1.

Figure 4:
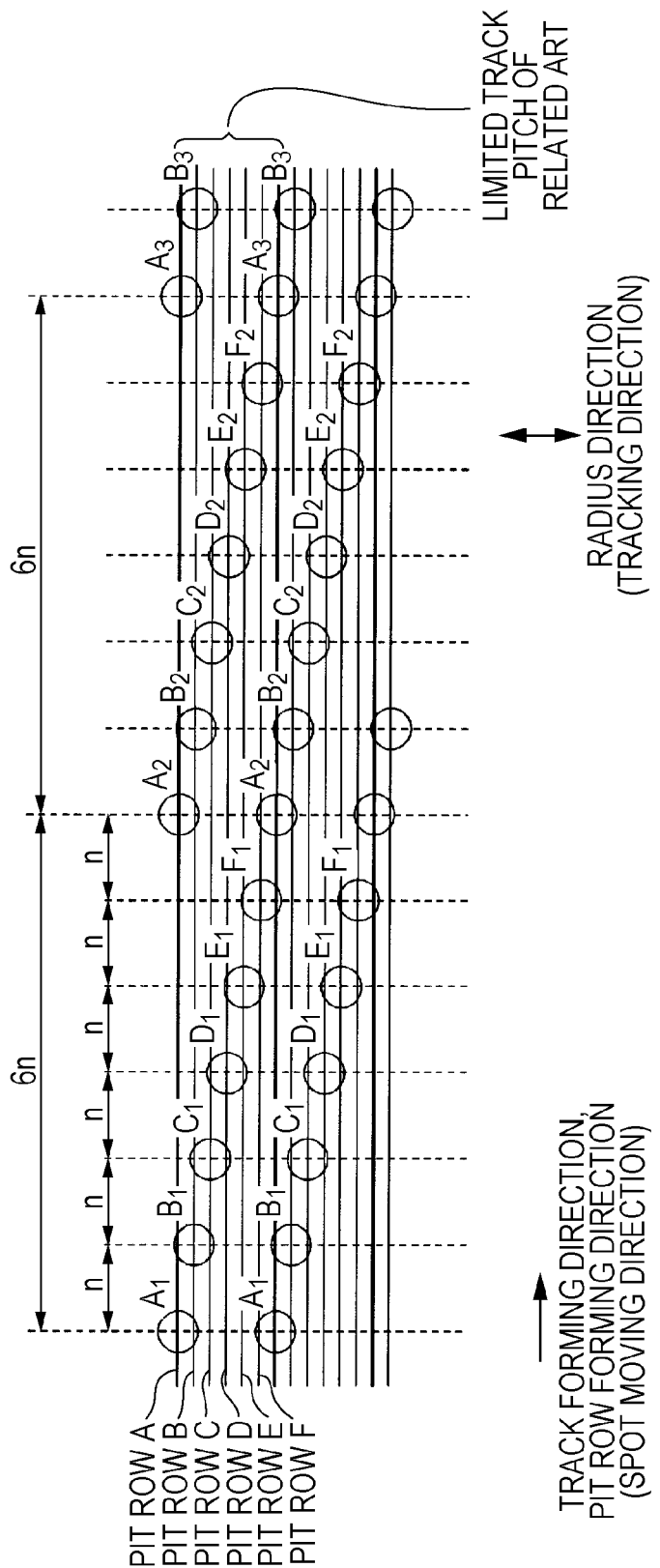
FIG. 4 is a plan view illustrating a partially enlarged surface of a reference face of the optical disc recording medium of the embodiment.

FIG. 4 is a plan view of partially enlarging the surface of the reference face Ref (the selective reflection film 3) in the bulk type recording medium 1.

In FIG. 4, a direction from left to right on paper is a forming direction of the pit row, that is, a forming direction of the track. In this case, the spot of the servo laser light is moved from left to right on paper by the rotation of the bulk type recording medium 1.

A direction (the longitudinal direction of paper) perpendicular to the forming direction of the pit row is the radial direction of the bulk type recording medium 1.

In FIG. 4, A to F represented by white circles in the drawing indicate pit formable positions. That is, in the reference face Ref, the pits are formed only at the pit formable position, and the pits are not formed at positions other than the pit formable positions.

Classification of the signs of A to F in the drawing indicates classification of the pit rows (classification of the pit rows arranged in the radial direction), and numerals attached to the signs of A to F indicate classification of the pit formable positions on the pit rows.

The interval represented by black thick lines in the drawing indicates the minimum track pitch (track pitch which is not over the optical limit: referred to as a limit track pitch of the related art) which can be realized in the bulk type recording medium 1 of the related art. As understood from this, in the bulk type recording medium 1 of this example, a total of 6 pit rows A to F are arranged within a limit 1-track width of the related art in the radial direction.

However, when the plurality of pit rows are merely arranged within the limit 1-track width of the related art, the formation position of the pits may overlap in the pit row forming direction, and thus the interval of the pits in the pit row forming direction may exceed the optical limit.

In this example, the following conditions are determined such that the intervals among the pit rows A to F arranged within the limit 1-track width of the related art in the pit row forming direction do not exceed the optical limit:

1) In the pit rows A to F, intervals of pit formable positions are limited to a predetermined first interval; and
2) The pit rows A to F, the intervals of the pit formable positions of which are limited as described above are arranged such that the pit formable positions deviate in the pit row forming direction by a predetermined second interval (i.e., phases of the pit row are shifted by the second interval).

Herein, the interval (the second interval) in the pit row forming direction of the pit formable positions in the pit rows A to F arranged in the radial direction is n. In this case, all of the pit rows A to F are arranged to satisfy the 2) condition, the intervals of the pit formable positions of the pit rows A-B, the pit rows B-C, the pit rows C-D, the pit row D-E, the pit rows E-F, and the pit rows F-A are n as shown.

The intervals (the first interval) of the pit formable positions in the pit rows A to F are 6n since a total of 6 pit row phases of A to F are realized in this case.

In the embodiment, the information reproducing based on the servo laser light on the reference face Ref is performed under the condition of wavelength λ=650 and numerical apertures NA=0.65 as the same as the case of a DVD (Digital Versatile Disc). On the contrary, in this example, a section length of the pit formable positions is a section length of 3T in the same manner as the shortest mark in the DVD, and intervals among edges of the pit formable positions of A to F in the pit row forming direction is set to a length of the same 3T. In other words, it is n=6T.

As a result, the conditions 1) and 2) are satisfied.

Herein, to understand a pit forming shape in the whole of the reference face Ref, a more specific pit row forming method will be described with reference to FIG. 5.

Figure 5:
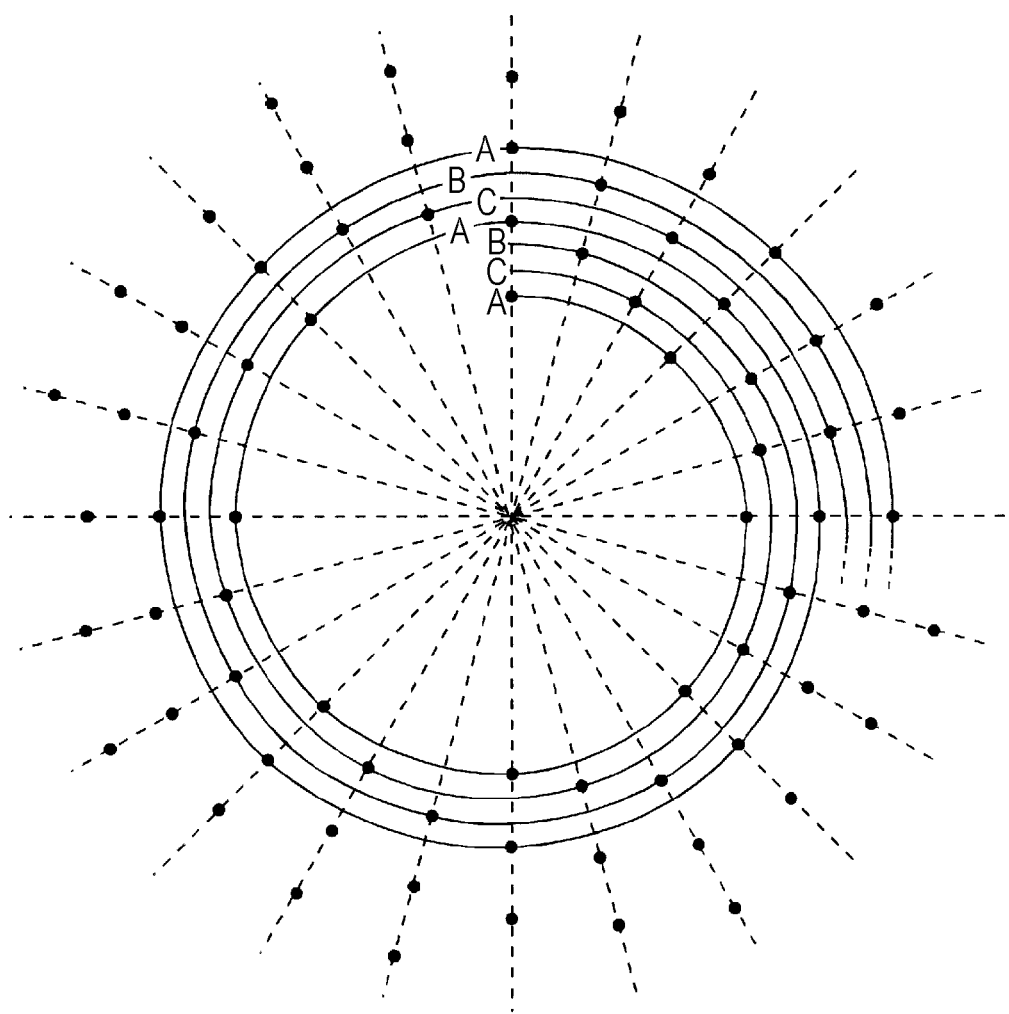
FIG. 5 is a diagram illustrating a forming shape of pits on the whole of the reference face.

In FIG. 5, in view of circumstances as shown, a case where kinds (phases) of pit rows are only three kinds A to C is exemplified.

In the drawing, the black circles indicate the pit formable positions.

As can be seen with reference to FIG. 5, on the reference face Ref of the bulk type recording medium 1, plural kinds of pit rows (in FIG. 5, three kinds A to C, but actually six kinds A to F) having different phases is one set, and the one set of plural kinds of pit rows is formed in spiral shape.

The tracking servo on one necessary pit row of the plural kinds of pit rows continues, and the spot position draws a spiral trace.

On the reference face Ref, the pit is formed by CAV (Constant Angular Velocity) method. From this, as shown, each of the plural kinds of pit rows can be aligned at an angular position where the pit formation positions (pit formable positions) are the same, in the radial direction.

The reason for recording the pits on the reference face Ref in the CAV method as described above is because the phase relation of the pit rows A to F as shown in FIG. 4 is to be kept no matter the area on the disc.

2-2. Address Information

Subsequently, an example of a format of address information recorded on the reference face Ref will be described with reference to FIG. 6A, FIG. 6B, and FIG. 6C.

First, FIG. 6A schematically shows the relation of the pit formable positions of the pit rows (A to F) having different pit row phases. FIG. 6A shows the pit formable positions by "*" marks.

As to be described later, in the recording and reproducing device 10 of the embodiment, one pit row is selected from the pit rows A to F, and the tracking servo is performed on the one selected pit row as a target.

However, a problem in this case is that the pit rows A to F are arranged at intervals exceeding the optical limit of the related art in the radial direction. That is, in this case, as a tracking error signal obtainable to move (scan) the beam spot on the track is a signal to which all the pits of A to F is applied, and thus it is difficult to trace the one selected pit row even when the tracking servo is performed on the basis of the tracking error signal.

For this reason, as described above, the recording and reproducing device 10 of the embodiment extracts the tracking error signal in the section of the pit formable position in the selected pit row, and the tracking servo is performed on the basis of the extracted tracking error signal (i.e., intermittently).

In the same manner, when reading the address information, a sum signal (a sum signal to be described later) of the section of the pit formable position of the selected pit row is extracted such that only information recorded in the selected pit row is selectively read, and a method of detecting the address information on the basis of the extracted sum signal is taken.

To cope with such a method of detecting the information, in the embodiment, a format of representing "0" and "1" of channel data according to whether or not the pits are formed at the pit formable positions is employed. That is, one pit formable position takes in charge of information of one channel bit.

In the embodiment, 1 bit of the data bit is represented by the data pattern of "0" and "1" based on the plurality of channel bits.

Specifically, in this example, as shown in FIG. 6B, the data bits "0" and "1" are represented for 4 channel bits, for example, a pattern "1011" of the 4 channel bits indicates a data bit "0" and a pattern "1101" of the 4 channel bits indicates a data bit "1".

In this case, an important point is that the channel bit "0" is not continuous. That is, the continuation of the channel bit "0" means that a period when it is difficult to obtain the error signal is continuous when the servo is performed intermittently using the track error signal as described above. Accordingly, it is very difficult to secure precision of the tracking servo.

For this reason, in the embodiment, for example, a condition in which the channel bit "0" is not continuous is satisfied by the definition of the data bit as described above. That is, the decrease in the precision of the tracking servo is suppressed to be minimal by the definition of the data bit as described above.

FIG. 6C shows an example of a sync pattern.

For example, in the sync pattern, as shown, the pattern is represented by 12 channel bits, the former 8 bits are a channel bit pattern "11111111" which is not matched with the definition of the data bit, and classification (kind) of sync is represented by the pattern of the latter 4 channel bits. Specifically, when the pattern of the 4 channel bits subsequent from the 8 bits is "1011", the sync pattern is Sync1, and when the pattern is "1101", the sync pattern is Sync2.

In the bulk type recording medium 1 of the embodiment, the address information is recorded subsequently from the sync as described above.

As the address information, at least absolute position information (information of radius position, and information of rotation angle position) is recorded.

For confirmation, in this example, the plurality of pit rows A to F are arranged within the limit 1-track width of the related art, but the recording of the address information is performed to assign individual information for each pit row such that the radius positions of the pit rows are individually represented (the pit rows can be recognized). That is, the same address information is not recorded for each pit row of A to F arranged within the limit 1-track width of the related art.

2-3. Specific Method of Tracking Servo

A method of performing the tracking servo on an arbitrary pit row from the pit row group formed to arrange the plurality of pit rows within the 1-track width of the related art as described above will be described in detail hereinafter.

FIG. 7 schematically shows the relation between a movement of the spot of the servo laser light on the reference face Ref by the rotation of the bulk type recording medium 1, waveforms of a sum signal, a sum differential signal, and a push-pull signal PP (also referred to as a PP signal, which are obtainable at that time.

The sum signal is a sum signal of the light receiving signal DT-sv obtainable by the plurality of light receiving elements as the servo light receiving unit 29 shown in FIG. 2, and the sum differential signal is a signal obtainable by differentiating the sum signal.

In this drawing, for convenience of description, it is assumed that pits are formed at all the pit formable positions in the drawing.

As shown, the beam spot of the servo laser light is moved by the rotation of the bulk type recording medium 1, and thus a signal level of the sum signal forms a peak at a cycle corresponding to the arrangement interval in the pit row forming direction of the pits of A to F. That is, the sum signal indicates an interval (forming cycle) in the pit row forming direction of the pits of A to F.

In the example of this drawing, since the spot of the servo laser light is moved along and on the pit row A, the peak value of the sum signal becomes the maximum when the sum signal passes through the formation position of the pit A in the pit row forming direction, and the peak value tends to gradually decrease throughout the formation positions of the pit B to the pit D. Thereafter, the peak value is changed to increasing tendency in order of the formation position of the pit E to the formation position of the pit F, and the peak value becomes the maximum when reaching the formation position of the pit A again. That is, since there is an effect of the pits in the pit rows E and F adjacent to the outer circumferential side at the formation positions of the pits E and F in the pit row forming direction, the peak value of the sum signal increases in order of each formation position of the pits E and F.

As the sum differential signal generated by differentiating the sum signal and the PP signal as the tracking error signal, it is possible to obtain waveforms as shown.

The sum differential signal is used to generate a clock CLK according to the interval in the pit row forming direction of the pit formation positions (strictly, the pit formable positions) of the pits A to F to be described later.

FIG. 8 is a diagram illustrating a timing signal generated on the basis of the sum differential signal and the sum signal in the generating of the clock CLK.

In the embodiment, a signal in which a position (timing) corresponding to the center position of each pit (peak position) is the rising position (timing) is generated as the clock CLK. Specifically, a signal obtained by slicing the sum signal by the predetermined threshold value Th1 shown in FIG. 7 and similarly a signal obtained by slicing the sum differential signal by the predetermined threshold value Th2 are generated, and the timing signal having the rising timing corresponding to the peak position is generated by taking AND of both signals.

Figure 9:
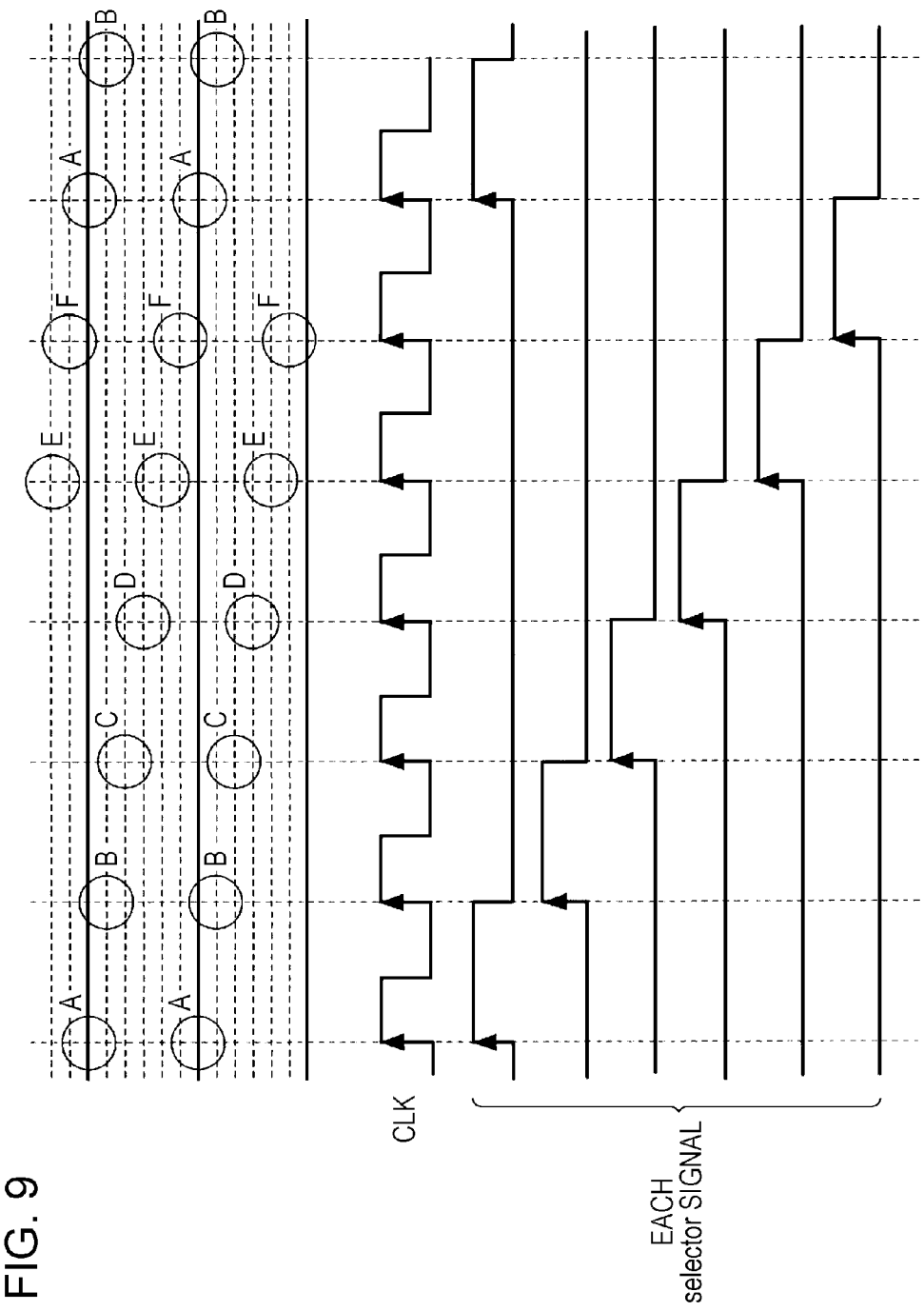
FIG. 9 is a diagram schematically illustrating relation of the clock generated from the timing signal, a waveform of each selector signal generated on the basis of the clock, and (a part of) pit rows formed on the reference face.

FIG. 9 schematically shows the relation between waveforms of the clock CLK generated from the timing signal generated by the sequence and selector signals generated on the basis of the clock signal CLK, and (a part of) pit rows formed on the reference face Ref.

As shown in the drawing, the clock CLK rises at the timing corresponding to the peak position of each pit (pit formable position), and an intermediate point between the rising positions becomes a signal considered as a falling position.

The clock CLK is generated by performing a PLL (Phase Locked Loop) process in which the timing signal generated as described above is considered as an input signal (reference signal).

In the embodiment, 6 kinds of selector signals representing the timing of each of the pit formable positions of A to F are generated from the clock CLK having a cycle corresponding to the forming interval of the pits A to F as described above. Specifically, the selector signals are generated by dividing the clock CLK by ⅙, and each of phases is deviated by ⅙ cycle. In other words, the selector signals are generated by dividing the clock CLK by ⅙ at each timing to deviate the rising timing by ⅙.

The selector signals becomes signals indicating the timings of the pit formable positions of the corresponding pit rows A to F, respectively.

In the embodiment, after the selector signals are generated, an arbitrary selector signal is selected, and the tracking servo control is performed according to the tracking error signal within the period represented by the selected selector signal, to trace the beam spot of the servo laser light on the arbitrary pit row of the pit rows A to F. That is, in such a manner, it is possible to trace the beam spot position of the servo laser light on the arbitrary pit row of A to F.

Since the tracking servo control on the arbitrary pit row of the pit rows A to F is possible, the application of the offset over ½ the track pitch (the limit track pitch of the related art) can be stably performed.

That is, in this case, even when the offset is applied to the tracking servo loop and the position of the beam spot is positioned, for example, on adjacent pit rows, the tracking servo does not deviate. The reason is because the interval of the adjacent pit rows is smaller than ½ the limit track pitch of the related art. Using this property, the operations of applying the offset to the servo loop and sequentially switching the pit rows that are the targets of the tracking server to the adjacent pit row are performed together, and thus the spot position (further the spot position of the recording and reproducing laser light) of the servo laser light can be gradually offset while keeping the state capable of performing the tracking servo. Even when the spot position is offset to some extent, the state capable of performing the tracking servo by the switching of the pit row as the target of the tracking servo as described above is kept. As a result, the shift of the spot position of an arbitrary amount of spot position over ½ the limit track pitch of the related art can be stably performed.

A specific method of the shift of the spot position with the sequential switching of the pit rows as the servo target will be described later again.

3. Overall Inner Configuration of Recording Device

Figure 10:
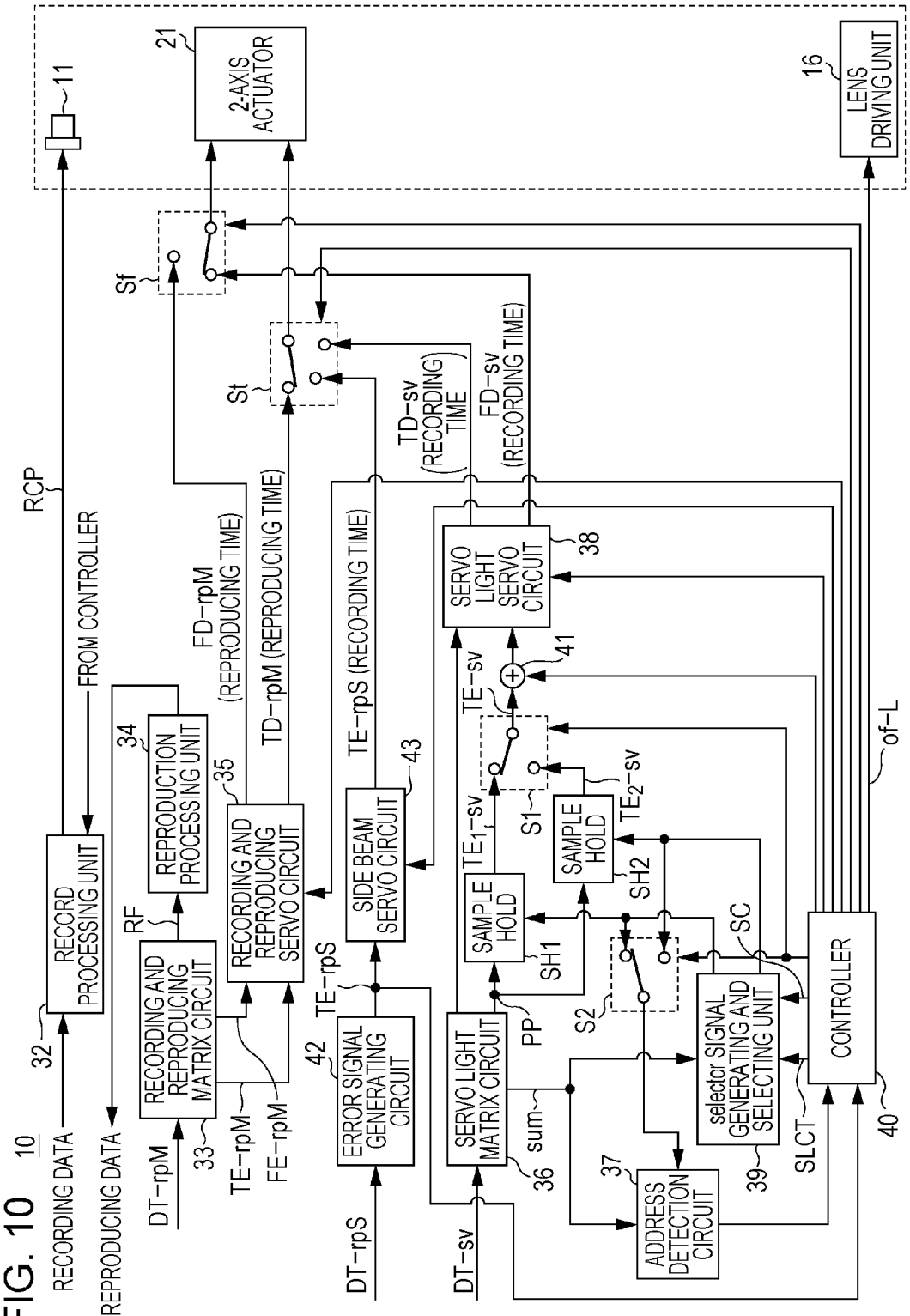
FIG. 10 is a block diagram illustrating an inner configuration of the whole of the recording device of the embodiment.

FIG. 10 shows an overall inner configuration of the recording and reproducing device 10.

In FIG. 10, the inner configuration of the optical pickup OP is shown by extracting only the recording and reproducing laser 11, the lens driving unit 16, and the 2-axis actuator 21 of the configuration shown in FIG. 2.

In FIG. 10, the recording and reproducing device 10 is provided with a record processing unit 32, a recording and reproducing light matrix circuit 33, and a reproduction processing unit 34, as a configuration of a signal processing system for performing recording and reproducing on the bulk layer 5 or focus and tracking control (i.e., position control based on the reflection light of the recording and reproducing laser light) of the object lens 20 at the time of reproducing the recording mark.

Data (recording data) to be recorded on the bulk type recording medium 1 is input to the record processing unit 32. The record processing unit 32 adds an error correction sign to the input recording data or performs a predetermined recording modulation encode, to obtain a recording modulation data row that is a binary data row of, for example, "0" and "1" actually recorded on the bulk type recording medium 1.

The recording processing unit 32 performs light emitting driving of the recording and reproducing laser 11 in the optical pickup OP by a recording pulse RCP based on the recording modulation data row generated as described above.

The recording and reproducing matrix circuit 33 is provided with a current voltage conversion circuit and a matrix operation and amplification circuit corresponding to the light receiving signal DT-rpM (output current) from the main beam detector 23M in the recording and reproducing light receiving unit 23 shown in FIG. 3, and generates a necessary signal by a matrix operation process.

Specifically, a high frequency signal (hereinafter, referred to as a reproducing signal RF) corresponding to the reproducing signal obtained by reproducing the recording modulation data row, a focus error signal FE-rpM for the focus servo control, and a tracking error signal TE-rpM for the tracking servo control are generated.

Figure 23:
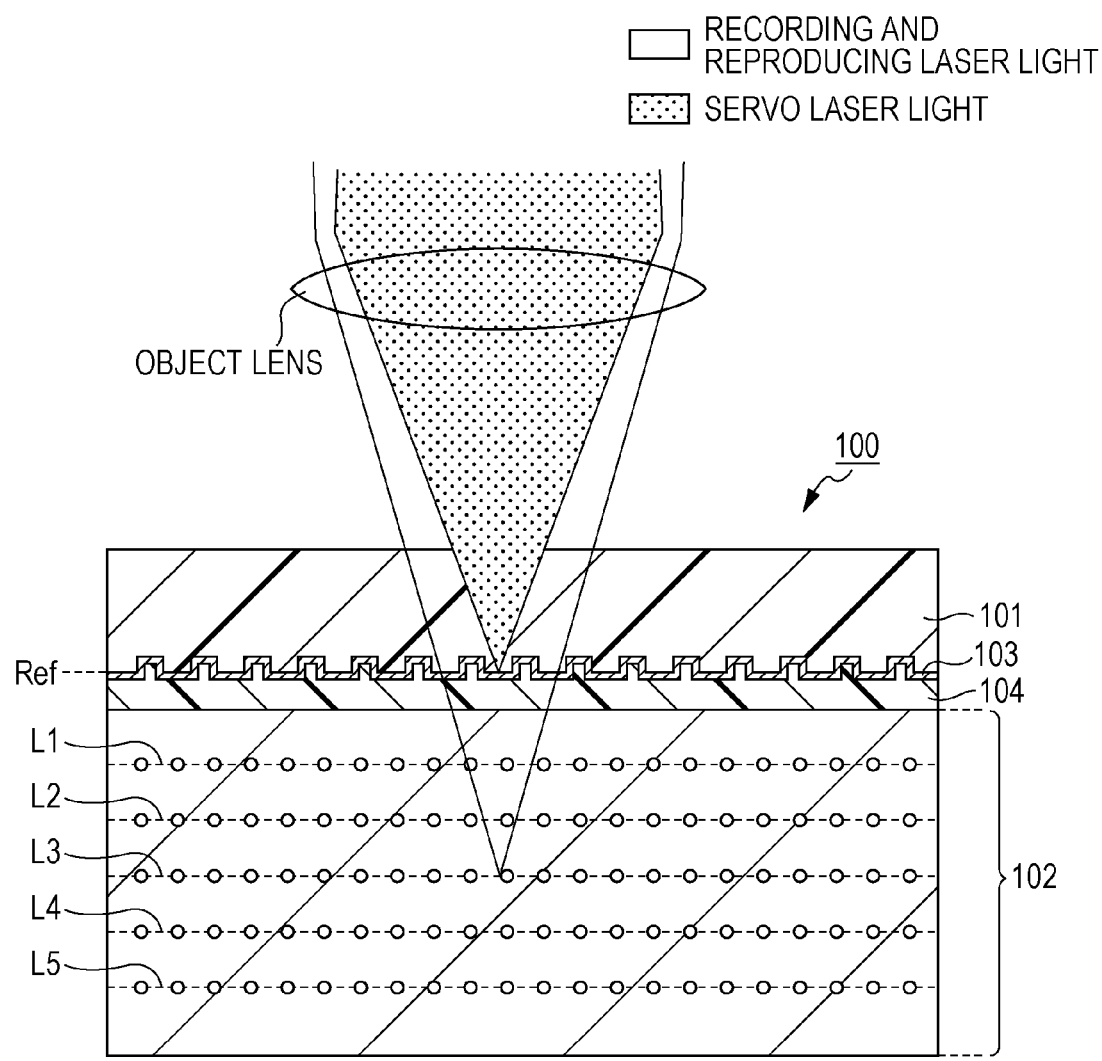
FIG. 23 is a diagram illustrating servo control at the time of reproducing on the bulk type recording medium.
Figure 24A:
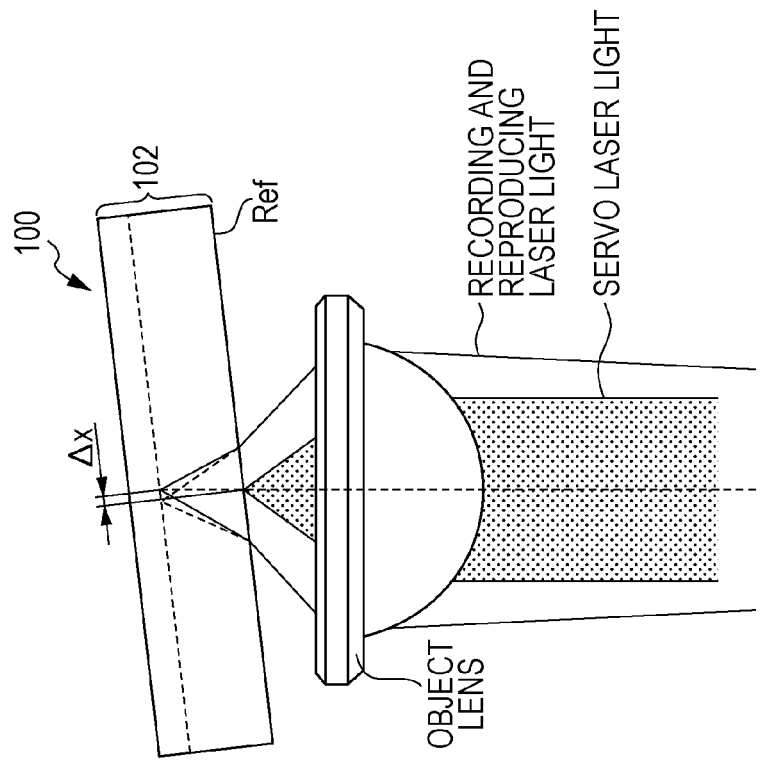
FIG. 24A and FIG. 24B are diagrams schematically illustrating a spot position deviation between recording and reproducing laser light and servo laser light caused by skew.
Figure 24B:
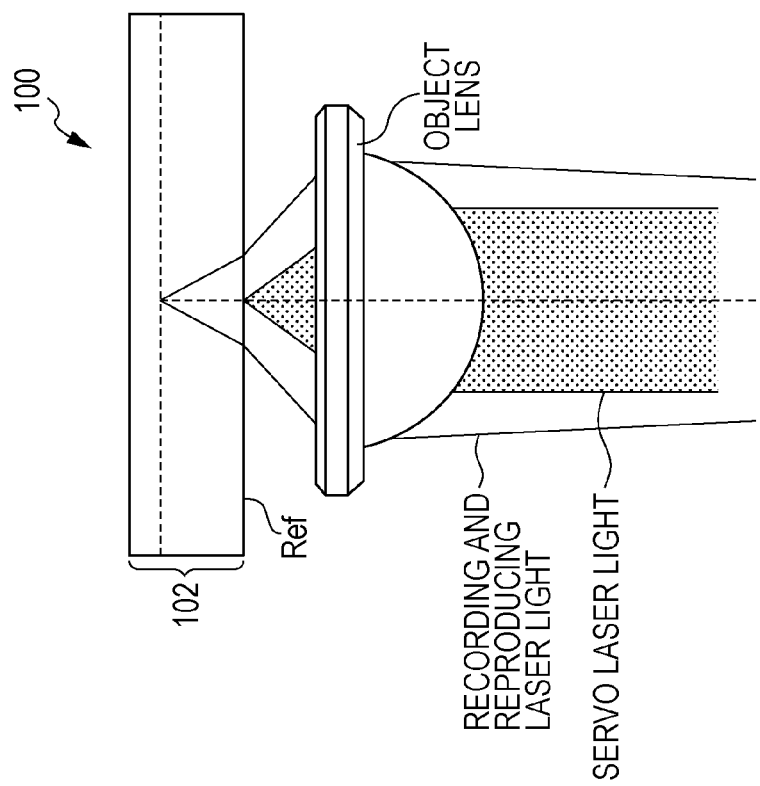

As understood from the description of FIG. 23, the focus error signal FE-rpM and the tracking error signal TE-rpM obtainable on the basis of the reflection light from the mark rows in the bulk layer 5 are used at the reproducing time.

The reproducing signal RF generated in the recording and reproducing matrix circuit 33 is supplied to the reproduction processing unit 34.

The focus error signal FE-rpM and the tracking error signal TE-rpM are supplied to the recording and reproducing light servo circuit 35.

The reproduction processing unit 34 performs a reproducing process for recovering the recording data such as a binarization process or a decoding and error correction process of the recording modulation sign on the reproducing signal RF, to obtain the reproducing data of reproducing the recording data.

The recording and reproducing light servo circuit 35 generates a focus servo signal FS-rpM and a tracking servo signal TS-rpM on the basis of the focus error signal FE-rpM and the tracking error signal TE-rpM supplied from the matrix circuit 33, and generates and outputs a focus driving signal FD-rpM and a tracking driving signal TD-rpM for driving a focus coil and a tracking coil of the 2-axis actuator 21 on the basis of the focus servo signal FS-rpM and the tracking servo signal TS-rpM.

As shown, the focus driving signal FD-rpM is supplied to a selector Sf, and the tracking driving signal TD-rpM is supplied to a selector St.

The recording and reproducing device 10 is provided with a servo light matrix circuit 36, an address detecting circuit 37, a servo light servo circuit 38, a selector signal generating and selecting circuit 39, a sample hold circuit SH1, a sample hold circuit SH2, a selector S1, a selector S2, and an adder 41, as a signal processing system for the reflection light of the servo laser light.

The servo light matrix circuit 36 generates a necessary signal on the basis of the light receiving signal DT-sv from the plurality of light receiving element in the servo light receiving unit 29 shown in FIG. 2.

Specifically, the servo light matrix circuit 36 in this case generates a push-pull signal PP, a sum signal, and a focus errors signal FE-sv for focus servo control.

As shown, the push-pull signal PP is supplied to the sample hold circuit SH1 and the sample hold circuit SH2. The focus error signal FE-sv is supplied to the servo light servo circuit 38.

The sum signal is supplied to the address detecting circuit 37 and the selector signal generating and selecting unit 39.

The address detecting circuit 37 detects address information (absolute position information including at least radius position information or rotation angle position information) recorded on the reference face Ref by inputting one selector signal selected by the selector S2 between two selector signals generated, selected and output by the selector signal generating and selecting unit 39 in a manner to be described above, on the basis of the result of sampling the value of the sum signal from the servo light matrix circuit 36 at the timing (in this case, at the section where the selector signal is a high level) of the pit formable position represented by the selector signal.

As described with reference to FIG. 6A, FIG. 6B, and FIG. 6C, in the case of the embodiment, in the address information of each pit row, it is recorded whether or not the pit is formed at the pit formable position in the pit row as information of one channel bit. The address detecting circuit 37 recognizes the value of the sum signal at the rising timing of the selector signal to recognize data of "0" or "1" of the one channel bit, and performs an address decoding process according to the format described with reference to FIG. 6A, FIG. 6B, and FIG. 6C on the basis of the result to detect (reproduce) of the recorded address information.

The address information (i.e., address information of the pit row that is the target of the tracking servo) detected by the address detecting circuit 37 is supplied to the controller 40.

The selector signal generating and selecting unit 39 generates the clock CLK based on the sum signal, generates the selector signals based on the clock CLK, and selectively outputs the generated selector signals.

Figure 11:
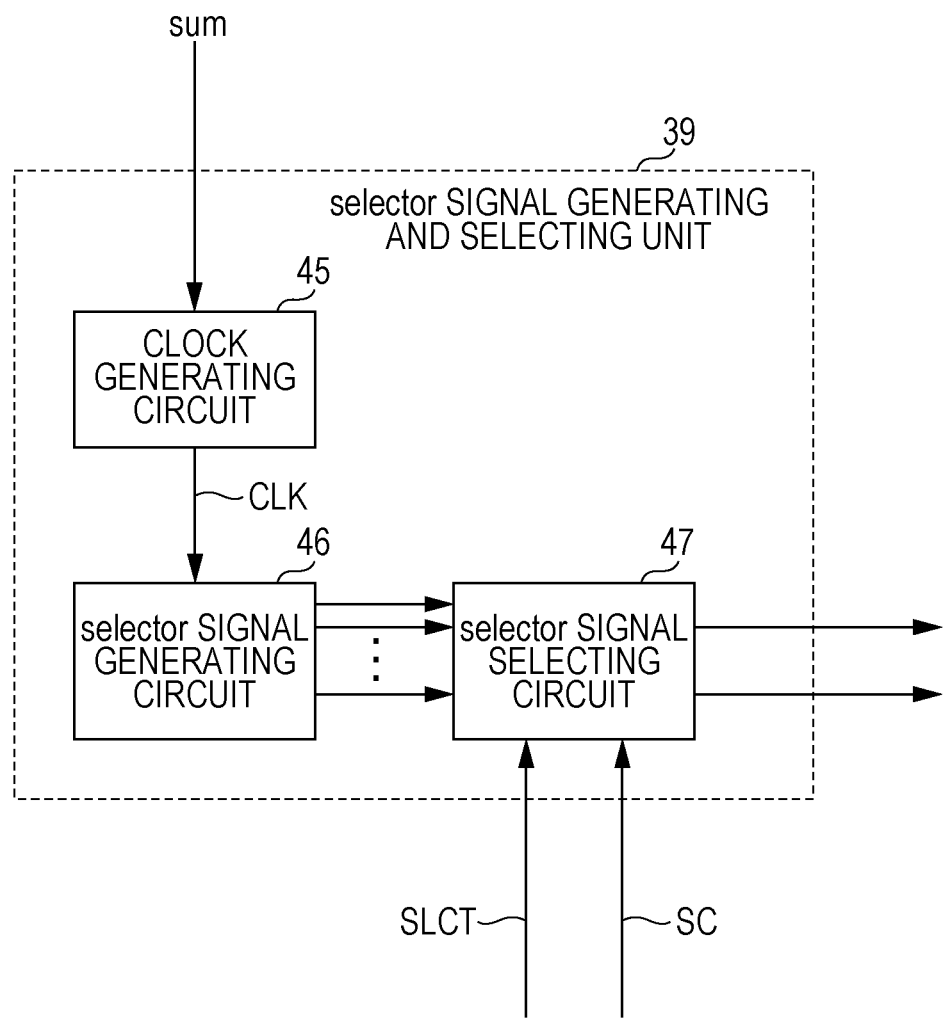
FIG. 11 is a diagram illustrating an inner configuration of a selector signal generating and selecting unit.

FIG. 11 shows an inner configuration of the selector signal generating and selecting unit 39.

As shown, the selector signal generating and selecting unit 39 is provided with a clock generating circuit 45, a selector signal generating circuit 46, and a selector signal selecting circuit 47.

The sum signal from the servo light matrix circuit 36 is input to the clock generating circuit 45. The clock generating circuit 45 generates the clock CLK according to the above-described sequence.

Figure 12:
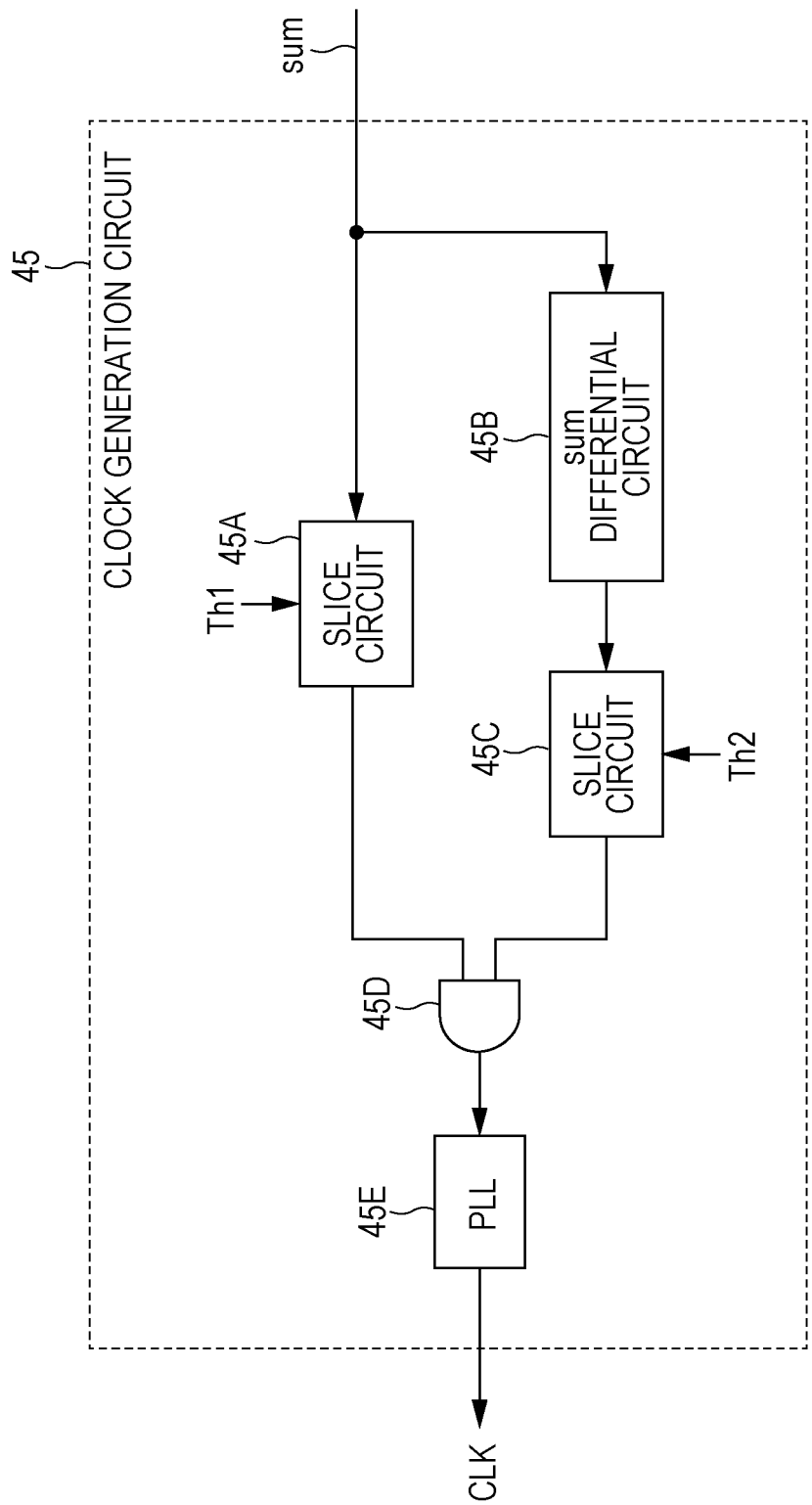
FIG. 12 is a diagram illustrating an inner configuration of a clock generating circuit.

The inner configuration of the clock generating circuit 45 is shown in FIG. 12.

In FIG. 12, the clock generating circuit 45 is provided therein with a slice circuit 45A, a sum differential circuit 45B, a slice circuit 45C, an AND gate circuit 45D, and a PLL circuit 45E.

The sum signal is input to the slice circuit 45A and the sum differential circuit 45A as shown. The slice circuit 45A slices the sum signal on the basis of the set threshold value Th1, and the result is output to the AND gate circuit 45D.

The sum differential circuit 45B differentiates the sum signal to generate the sum differential signal described above. The slice circuit 45C slices the sum differential signal generated by the sum differential circuit 45B on the basis of the set threshold value Th2, and outputs the result to the AND gate circuit 45D.

The AND gate circuit 45D takes the AND of the output from the slice circuit 45A and the output from the slice circuit 45C to generate the timing signal described above.

The PLL circuit 45E performs a PLL process using the timing signal obtainable by the AND gate circuit 45D as described above as an input signal, to generates the clock CLK.

Returning to FIG. 11, the clock CLK generated by the clock generating circuit 45 is supplied to the selector signal generating circuit 46.

The selector signal generating circuit 46 generates 6 kinds of selector signals representing the timings of the pit formable positions of the pit rows A to F on the basis of the clock CLK. Specifically, the selector signal generating circuit 46 generates a signal shifted in phase by ⅙ as signals obtained by dividing the clock CLK by ⅙, thereby obtaining the 6 kinds of selector signal.

The 6 kinds of selector signals are supplied to the selector signal selecting circuit 47.

The selector signal selecting circuit 47 selectively outputs a selector signal of the phase instructed by a selection signal SLCT supplied from the controller 40 and a selector signal for the pit row adjacent to the outer circumferential side or the inner circumferential side of the pit row representing the pit formable position by the instructed selector signal, among the 6 kinds of input selector signals.

In this case, the selector signal selecting circuit 47 changes whether to select the selector signal of the pit row adjacent to the outer circumferential side or to select the selector signal of the pit row adjacent to the inner circumferential side as the selector signal selected together with the selector signal instructed by the selection signal SLCT, according to a switching signal SC supplied from the controller 40.

The selective outputting of the selector signal of the pit row adjacent to the outer circumferential side or the inner circumferential side by the selector signal selecting circuit 47 together with the selector signal instructed by the selection signal SLCT as described above is related to the performing of sequentially changing the pit row that is the tracking servo to the pit row adjacent to the outer circumferential side or the inner circumferential side in the recording method as the embodiment to be described later, which will be described later again.

The description is returned to FIG. 10.

Between the two selector signals output from the selector signal selecting circuit 47, one is supplied to the sample hold circuit SH1, and the other is supplied to the sample hold circuit SH2.

Each of the sample hold circuit SH1 and the sample hold circuit SH2 is provided with an A/D converter, and sample-holds the push-pull signal PP supplied from the servo light matrix circuit 36 at the rising edge of the input selector signal.

The tracking error signals obtainable by the sample-holding of the push-pull signals PP by the sample hold circuit SH1 and the sample hold circuit SH2 are represented by a tracking error signal $TE_1$-sv and a tracking error signal $TE_2$-sv, respectively.

The tracking error signal $TE_1$-sv and the tracking error signal $TE_2$-sv are supplied to the selector S1.

The selector S1 selectively outputs the side instructed by the controller 40 between the tracking error signal $TE_1$-sv and the tracking error signal $TE_2$-sv.

The two selector signals output from the selector signal selecting circuit 47 are a selector signal for the pit row that is the target of the tracking servo and a selector signal for the pit row adjacent to the outer circumferential side or the inner circumferential side in the pit rows. That is, as understood from this, the two tracking error signals $TE_1$-sv and $TE_2$-sv input to the selector S1 is a signal indicating a tracking error for the pit row that is the target of the tracking servo and a signal indicating a tracking error for the pit row adjacent to the outer circumferential side or the inner circumferential side of the pit row.

The selector S1 selectively outputs a signal on the side indicating the tracking error for the pit row to be considered as the target of the tracking servo between the two tracking error signals $TE_1$-sv and $TE_2$-sv on the basis of the instruction of the controller 40.

Hereinafter, the tracking error signal selectively output by the selector S1, in other words, the tracking error signal indicating the tracking error for the pit row to be considered as the target of the tracking servo is represented by a tracking error signal TE-sv.

The tracking error signal TE-sv is supplied to the servo light servo circuit 38 through an adder 41.

The servo light servo circuit 38 generates a focus servo signal FS-sv and a tracking servo signal TS-sv on the basis of the focus error signal FE-sv and the tracking error signal TE-sv passing through the adder 41.

A focus driving signal FD-sv and a tracking driving signal TD-sv are generated and output on the basis of the focus servo signal FS-sv and the tracking servo signal TS-sv.

As shown, the focus driving signal FD-sv is supplied to the selector Sf described above. The tracking driving signal TD-sv is supplied to the selector St.

The servo light servo circuit 38 performs a track jump operation (a jump operation between pit rows) by applying a jump pulse to the tracking coil of the 2-axis actuator 21 considering the tracking servo loop as OFF, according to the instruction from the controller 40 at the recording time.

The two selector signals output from the selector signal generating and selecting unit 39 (selector signal selecting circuit 47) described above are also input to the selector S2 as shown.

The selector S2 selects a selector signal on the side instructed by the controller 40 between the supplied two selector signals, and outputs the selector signal to the address detecting circuit 37 described above.

As described above, the two selector signals output from the selector signal selecting circuit 47 are a selector signal for the pit row considered as the target of the tracking servo and a selector signal for the pit row adjacent to the outer circumferential side or the inner circumferential side for the pit row. The selector S2 selects the selector signal to supply the selector signal for the pit row that is the target of the tracking servo to the address detecting circuit 37 on the basis of the instruction from the controller 40. That is, the address detecting circuit 37 detects the address information recorded in the pit row considered as the target of the tracking servo.

The recording and reproducing device 10 is provided with an error signal generating circuit 42 and a side beam servo circuit 43 as a signal processing system for the reflection light of the inner circumferential side beam described above.

The error signal generating circuit 42 generates the tracking error signal TE-rpS by inputting the light reception signal DT-rpS from the plurality of light receiving elements ($A_S$, $B_S$, $C_S$, and $D_S$) in the side beam detector 23S shown in FIG. 3.

Specifically, the error signal generating circuit 42 in this example generates a tracking error signal based on a DPD (Differential Phase Detection) method as the tracking error signal TE-rpS based on the reflection light of the inner circumferential side beam. That is, when the set of the light receiving elements $A_S$ and $B_S$ and the set of the light receiving elements $C_S$ and $D_S$ in the side beam detector 23S shown in FIG. 3 are the sets adjacent in the direction corresponding to the disc radial direction, respectively, the tracking error signal TE-rpS is calculated by TE-rpS=Ph($A_S$i+$C_S$i)−Ph($B_S$i+$D_S$i). However, in the formula, $A_S$i, $B_S$i, $C_S$i, and $D_S$i indicate the light reception signals of the light receiving elements $A_S$, $B_S$, $C_S$, and $D_S$, and Ph indicates a signal phase.

The tracking error signal TE-rpS generated in the error signal generating circuit 42 is supplied to the side beam servo circuit 43, and is supplied to the controller 40.

The side beam servo circuit 43 generates the tracking servo signal TS-rpS on the basis of the tracking error signal TE-rpS, and generates the tracking driving signal TD-rpS on the basis of the tracking servo signal TS-rpS.

As shown, the tracking driving signal TD-rpS is supplied to the selector St.

The controller 40 is formed of a micro computer provided with, for example, a CPU (Central Processing Unit), and a memory (storage device) such as a ROM (Read Only Memory) and a RAM (Random Access Memory), and performs a control process based on programs stored in, for example, the ROM, to control the whole of the recording and reproducing device 10.

For example, the controller 40 performs control (setting) of the focus position of the recording and reproducing laser light on the basis of the value of the offset of-L set corresponding to each layer position as described above. Specifically, the lens driving unit 16 in the optical pickup OP is driven on the basis of the value of the offset of-L set corresponding to the information recording layer position L that is the recording target to select the recording position in the depth direction.

Figure 22:
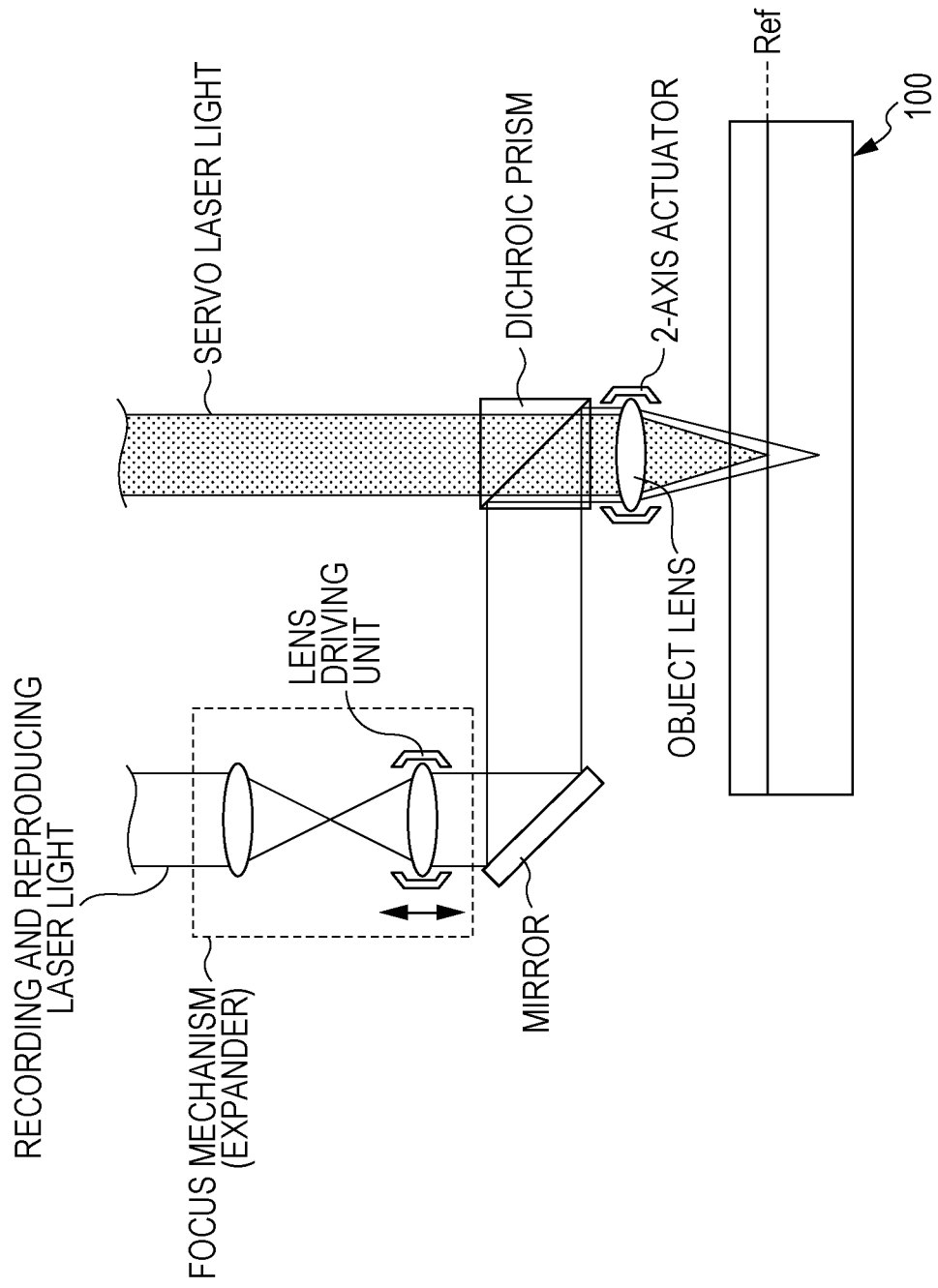
FIG. 22 is a diagram illustrating an outline of an optical system to perform recording and reproducing of the bulk type recording medium.

The controller 40 also perform control for realizing the servo control switching of the object lens 20 at the recording and reproducing time as described in FIG. 21 to FIG. 23.

Specifically, at the recording time, the controller 40 controls the selector Sf to select the focus driving signal FD-sv from the servo light servo circuit 38, and controls the selector St to select the tracking driving signal TD-sv from the servo light servo circuit 38, such that the focus driving signal FD-sv and the tracking driving signal TD-sv are supplied to the focus coil and the tracking coil in the 2-axis actuator 21. That is, at the recording time, the servo control based on the reflection light from the reference face Ref of the servo laser light is performed as the servo control of the object lens 20.

In this example, at the recording time, the controller 40 controls the selector St to select the tracking driving signal TD-rpS from the side beam servo circuit 43, to perform control of performing the tracking servo of the object lens 20 based on the reflection light of the inner circumferential side beam, which will be described later.

At the reproducing time, the controller 40 controls the selector Sf to select the focus driving signal FD-rpM from the recording and reproducing light servo circuit 35, and controls the selector St to select the tracking driving signal TD-rpS from the recording and reproducing light servo circuit 35, such that the focus driving signal FD-rpM and the tracking driving signal TD-rpM are supplied to the focus coil and the tracking coil in the 2-axis actuator 21. That is, the servo control of the object lens 20 based on the reflection light from the mark row for which the recording based on the main beam is completed is performed corresponding to the reproducing time.

The controller 40 also performs seek operation control for the servo light servo circuit 38. That is, the controller 40 performs an instruction to the servo circuit 38 to move the spot position of the servo laser light to a predetermined target address on the reference face Ref, and a selective instruction of the selector signal based on the selection signal SLCT for the selector signal generating and selecting unit 39 (selector signal selecting circuit 47).

For example, the seek operation control in this case is performed substantially in the following sequence:

1) moving to the vicinity of the target address by movement of the whole of the optical pickup OP using the slide driving unit described above;

2) focus servo ON of the servo laser light;

3) generating the clock CLK based on the sum signal and generating the selector signals;

4) performing the tracking servo control on an arbitrary pit row on the basis of the arbitrarily selected selector signal; and 5) performing the pit row jump from the address to the target address since the address information (information for recognizing the pit row) can be read by performing the tracking servo in the above 4).

The controller 40 performs an instruction to the servo circuit 38 to perform the operations of 1) and 2). The controller 40 performs the selection instruction of the selector signal based on the predetermined phase on the selector signal generating and selecting unit 39 by the selection signal SLCT to select the arbitrary selector signal in the above 4).

The controller 40 inputs the address information detected by the address detecting circuit 37 according to the tracking servo based on the above 4) to perform the operation of 5), calculates the number of jumps of the pit row necessary for the target address on the basis of the address information, and performs an instruction to perform the pit row jump operation on the servo circuit 38 by the number of jumps.

The controller 40 performs the supply of the selection signal SLCT and the switching signal SC to the selector signal generating and selecting unit 39, the switching control of the selector S1, the switching control of the selector St, and the applying of the offset value to the adder 41, to realize the recording method as the embodiment, which will be described later again.

4. Recording Method as Embodiment

In the recording method of the embodiment, as the object thereof, the recording based on the self-tracking is performed on the bulk layer 5, to prevent the overlap or intersection of the mark rows from occurring and also to prevent the recording capacity in the recording layer from being reduced.

However, as described with reference to FIG. 26A to FIG. 27B, when the self-tracking method is applied to the bulk recording, there is a problem of failure in switching to the tracking servo based on the reflection light from the mark row for which the recording of the side beam is completed, from the tracking servo based on the reflection light of the servo laser light from the reference face Ref when a relatively large difference occurs between the spot position of the servo laser light and the spot position of the recording and reproducing laser light by the occurrence of deterioration of the slide mechanism or the occurrence of disturbance.

In the embodiment, even when the spot position of the recording and reproducing laser light relatively greatly deviates from the spot position of the servo laser light by the deterioration of the slide mechanism or the disturbance as described above, the following method is proposed to appropriately perform the switching to the self-tracking.

Figure 13:
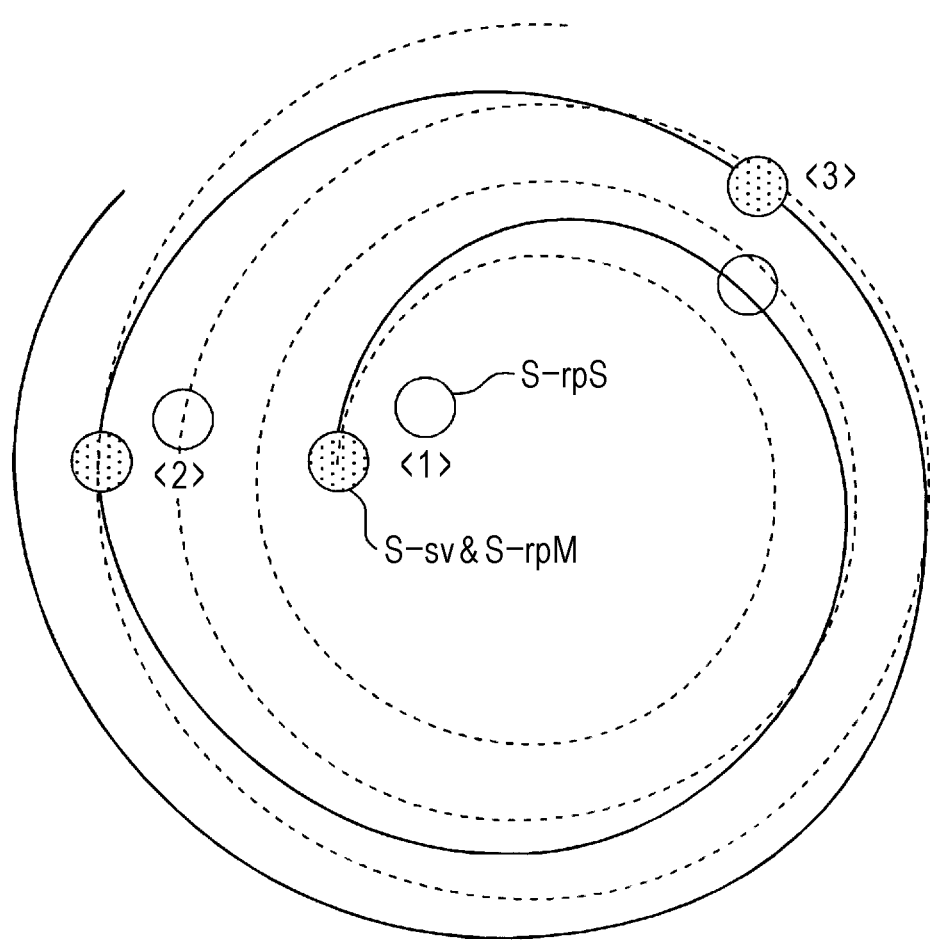
FIG. 13 is a diagram illustrating a recording method as the embodiment.

FIG. 13 is a diagram illustrating the recording method as the embodiment.

In FIG. 13, the broken line in the drawing shows a trace drawn when the tracking servo is continuously performed on any one kind of pit row of 6 kinds of pit rows A to F formed on the reference face Ref. In other words, the pitch of the broken line in the radial direction is the same as the limit track pitch of the related art.

The solid line shows a trace of the recording mark row when the recording is performed by the method as the embodiment.

In FIG. 13, the patterned circles in the drawing indicate the irradiation spot S-sv of the servo laser light and the irradiation spot S-rpM (S-sv and S-rpM in the drawing) of the main beam, and the white circles indicate the irradiation spot S-rpS of the inner circumferential side beam.

In FIG. 13, in view of circumstances of the drawing, the spot position difference in the recording and reproducing laser light side with respect to the servo laser light caused by skew or lens shift does not occur, and the spot S-sv and the Spot S-rpM overlap in the direction parallel to the recording face inward direction.

First, as <1> in the drawing, the recording on the bulk layer 5 based on the main beam is started in a state where the tracking servo is performed on any pit row of the reference face Ref by the servo laser light.

Figure 26A:
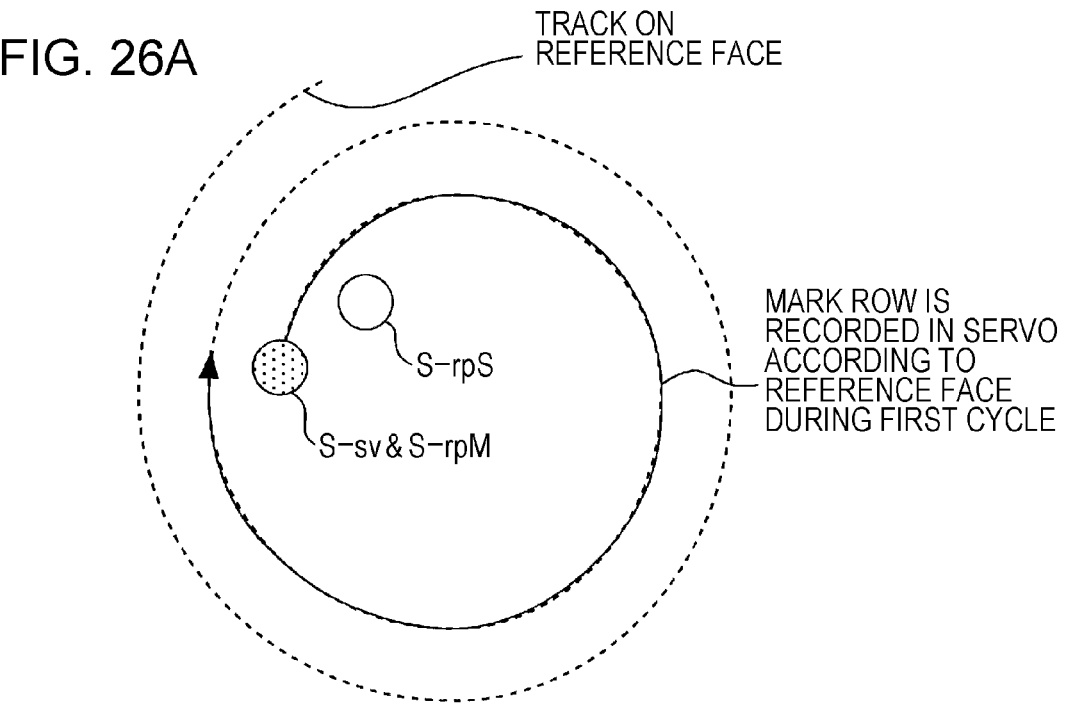
FIG. 26A and FIG. 26B are diagrams illustrating a specific recording operation when a self-tracking method is applied to the bulk recording.
Figure 26B:
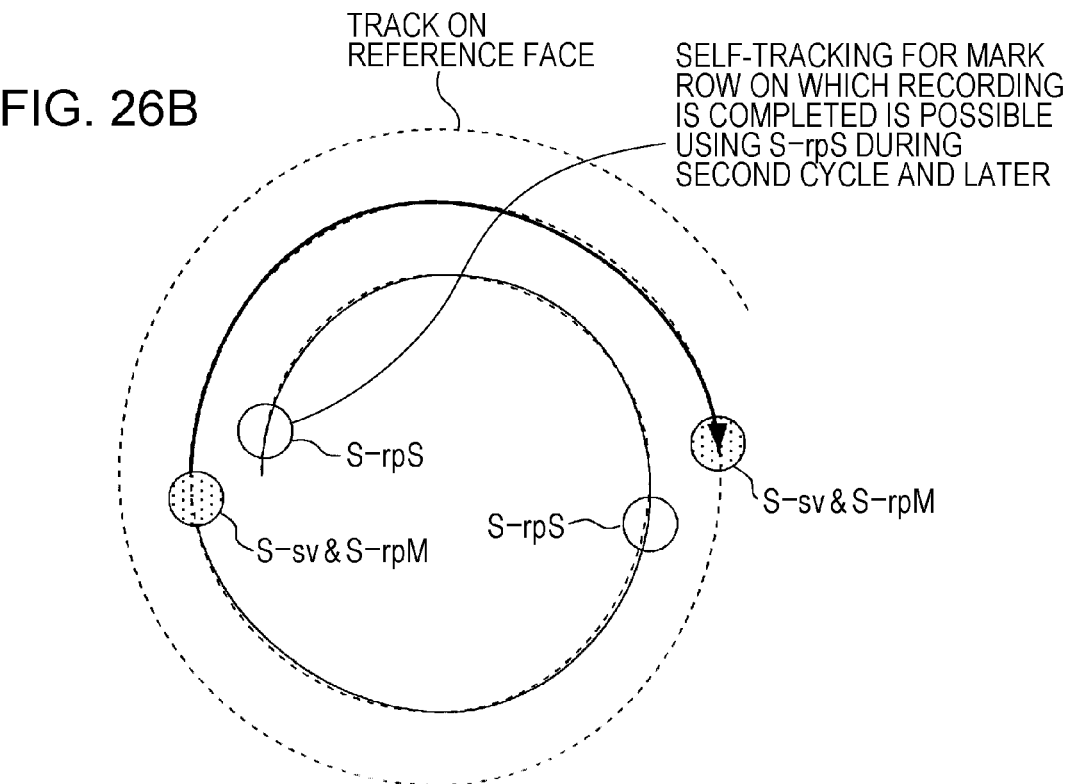
Figure 27A:
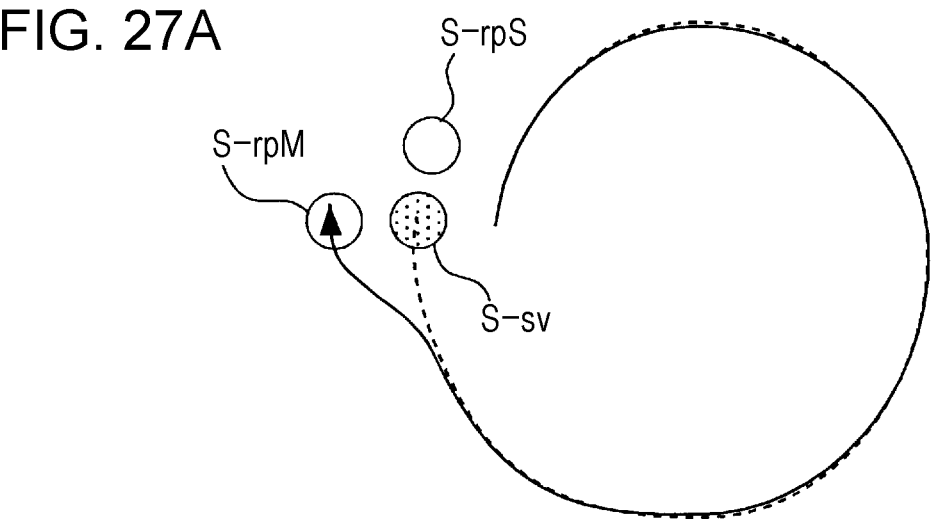
FIG. 27A and FIG. 27B are diagrams illustrating a problem occurring when the self-tracking method is applied to the bulk recording.
Figure 27B:
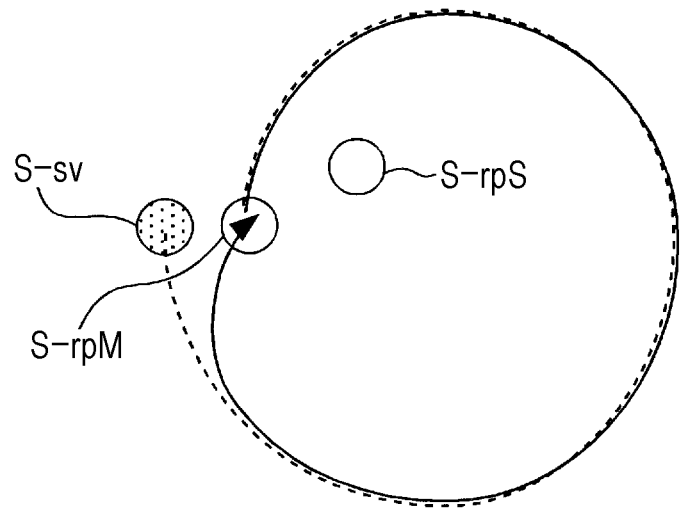

The point of starting the recording on the bulk layer 5 in the state where the tracking servo is performed on the position guide of the reference face Ref by the servo laser light is the same as the method described in FIG. 26A and FIG. 26B.

In the embodiment, the position that is the target of the tracking servo is gradually shifted from the original position to the outer circumferential side up to <2> in the drawing where the recording of one disc cycle is completed (ended) after the recording on the bulk layer 5 is started in the state where the tracking servo is performed by the servo laser light.

Specifically, in this case, the amount of shifting the servo target position up to the recording completion of the one disc cycle is set to an amount corresponding to the maximum value of the amount of the spot position deviation, which is estimated considering the amount of spot position deviation caused according to the skew or disc eccentricity and the deterioration of the slide mechanism or the disturbance.

For example, when the maximum amount of spot position deviation which may be caused by the skew is $\pm d_{skew}$, the amount of spot position deviation which may be caused by the disc eccentricity is $\pm d_{shift}$, the maximum amount of spot position deviation which may be caused by the deterioration of the slide mechanism is $\pm d_{slider}$, and the maximum amount of spot position deviation which may be caused by the disturbance is $\pm d_{disturb}$, the maximum value of the amount of spot position deviation may be represented by $|d_{skew}|+|d_{shift}|+|d_{slider}|+|d_{disturb}|$.

For simplification of the description of FIG. 13, it is assumed that the maximum value of the amount of spot position deviation is accurately one track (one track in the limit track of the related art: radial direction pitch of the pit rows in the same phase).

In the vicinity of the recording completion position of the first cycle, the amount of deviation of the servo target position may be at least the maximum value of the amount of spot position deviation, considering only the point of preventing the overlap or intersection of the recording mark with the recorded mark row from occurring. That is, for example, when the maximum value of spot position deviation is one track as described above, and when the servo target position is shifted to the outer circumferential side more than one trace, the overlap of the mark rows of the first cycle and the second cycle can be prevented from occurring even when the maximum spot position deviation occurs on the inner circumferential side (i.e., in this case, difference in one track occurs).

However, even when the overlap of the mark rows of the first cycle and the second cycle can be prevented, the mark rows of the first cycle and the second cycle are close to the extent of exceeding the optical limit of the mark reproducing light, and thus it is difficult to appropriately reproduce the recorded mark row.

Accordingly, considering this point, at least the amount of shifting the servo target position to the outer circumferential side at one disc cycle has to be set larger than "1 track width on reference face Ref"+"minimum track pitch on bulk layer 5 side".

In this example, the recording and reproducing condition for the reference face Ref is laser light wavelength λ=650 nm and numerical apertures NA of the object lens 20 (in this case, the effective numerical apertures)=0.65, the recording and reproducing condition for bulk layer 5 is wavelength λ=405 nm and NA=0.85. Thus, the track pitch of the bulk layer 5 side can be set narrower. However, in this example, the amount of shifting the servo target position at one disc cycle is set to 2 tracks on the reference face Ref to secure a sufficient margin.

By the setting of the shift amount, the interval of the mark rows of the first cycle and the second cycle does not exceed the optical limit of the mark recording light while preventing the overlap or intersection of the mark rows of the first cycle and the second cycle in the vicinity of the first cycle recording completion position, and thus it is possible to appropriately perform the subsequent mark reproducing.

For example, when the servo target position is shifted by one track at the one disc cycle as described above, the amount of actual spot offset may be stably controlled by merely applying the offset to the tracking servo loop.

In this example, the format (hereinafter, also referred to as variable track pitch format) as described in FIG. 4 to FIG. 6C is employed as the recording format of the pit row on the reference face Ref, the shift of the servo target position is performed to accompany the operation of sequentially changing the pit rows that are the servo target, and thus it is possible to more accurately control the shift amount of the servo target position.

Figure 14:
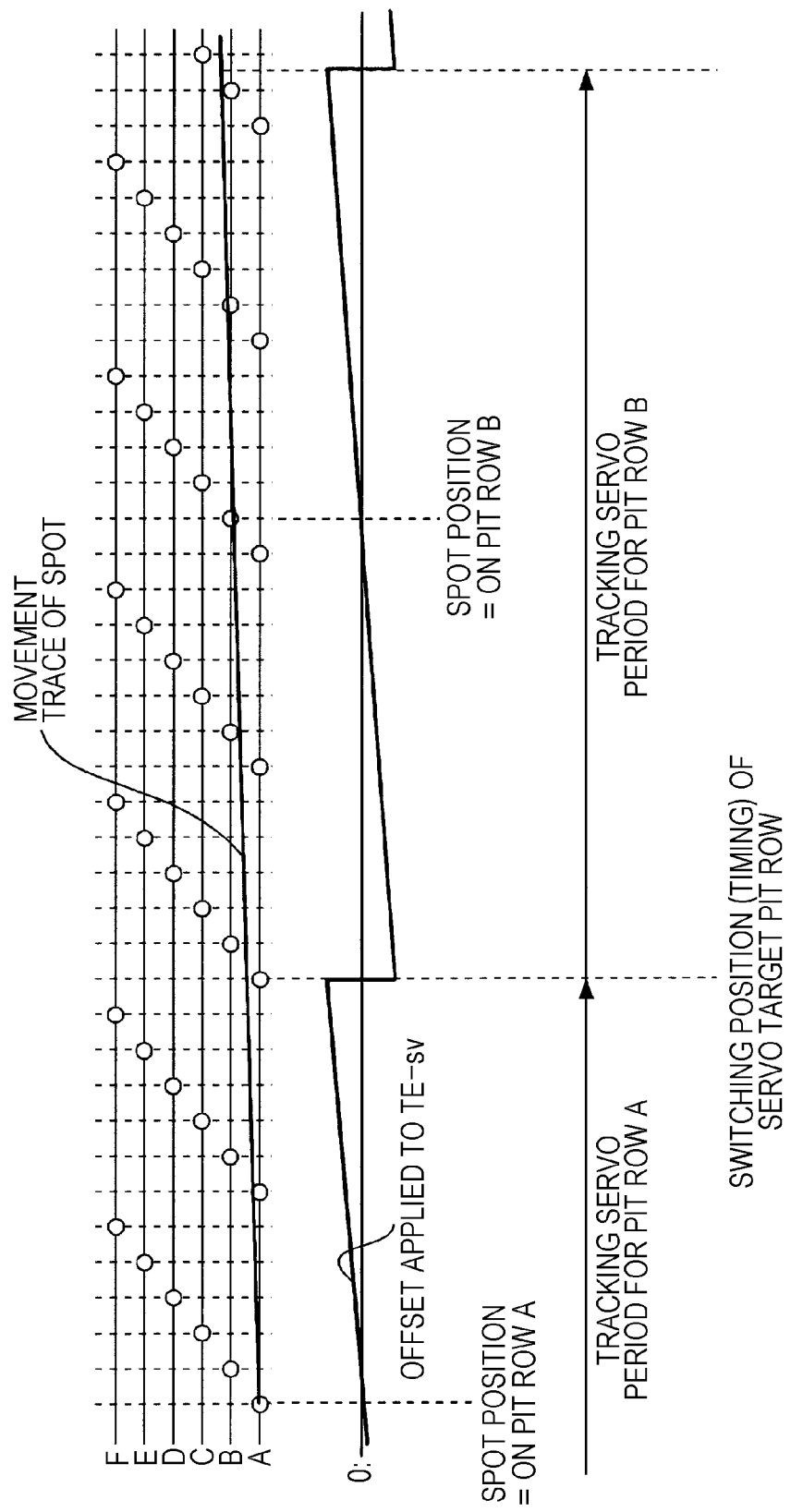
FIG. 14 is a diagram illustrating a method for shifting a servo target position to an outer circumferential side or an inner circumferential side.

FIG. 14 is a diagram illustrating a specific shift method of the servo target position with the change of the pit rows that are the tracking servo target, and shows the relation of the offset to be applied to the tracking servo loop, the classification of the pit rows to be selected as the servo target, and the movement trace of the spot S-sv to realize the shift of the servo target position.

In FIG. 14, only a section from the recording start position to the change of the second servo target pit row is shown.

As clearly seen from FIG. 14, when the servo target position is gradually shifted to the outer circumferential side, the pit rows that are the servo target are sequentially switched to the pit rows adjacent to the outer circumferential side while a saw-tooth waveform offset as shown is applied to the servo loop.

First, as the saw-tooth waveform offset, the setting of the inclination direction of gradually shifting the position of the spot S-sv of the servo laser light to the outer circumferential side (i.e., the recording direction side) is used as the inclination direction. For example, in this example, in the tracking servo system of the servo laser light, the object lens 20 is driven from the reference position to the outer circumferential side according to the positive tracking error signal TE-sv, the object lens 20 is driven from the reference position to the inner circumferential side according to the negative tracking error signal TE-sv. Accordingly, as the saw-tooth waveform offset in this case, an offset with an inclination in which a value thereof gradually gets larger with the lapse of time as shown in the drawing is used.

The magnitude (angle) of the inclination of the saw-tooth waveform offset determines the amount of deviation of the servo target position when one disc cycle recording is performed. In this example as described above, since the servo target position is shifted to the outer circumferential side at one disc cycle by 2 tracks, the magnitude of the inclination of the saw-tooth waveform offset is set to realize such a shift amount.

The pit rows that are the servo target are sequentially switched to the pit rows adjacent to the outer circumferential side while performing the applying of the saw-tooth waveform offset. In other words, the selector signal to obtain the tracking error signal TE-sv representing the tracking error for the pit row that is the servo target is switched to the selector signal corresponding to the pit row adjacent to the outer circumferential side.

When the method of sequentially changing the servo target pit rows as described above is employed, obviously, it is necessary to predetermine the change position (timing) of the servo target pit row.

In the embodiment, the switching position of the servo target pit rows is set to a position of an intermediate point between the adjacent servo target pit rows.

For confirmation, in the embodiment, the switching of the servo target pit rows is performed, and thus the offset applied when the servo target position is shifted is the saw-tooth waveform offset as described above. That is, it is a waveform in which polarity thereof is reversed at the switching timing of the pit rows that are the servo target.

As shown, the value of the offset is "0" when the position of the spot S-sv is on the pit row that is the target. Thereafter, when the value increases and the spot S-sv is shifted to the outer circumferential side to reach the intermediate point with the pit row adjacent to the outer circumferential side and reach the switching timing, the value is reversed from the positive value to the negative value. At this time, the absolute values before and after the switching are the same. This is because the switching timing is set to the intermediate point between the pit rows adjacent as described above.

As described above, the sequential switching of the pit rows that are the servo target is repeated while applying the saw-tooth offset to the tracking servo loop, and thus it is possible to gradually shift the position of the spot S-sv to the outer circumferential side while keeping the state of performing the tracking servo.

According to such a method, even when the spot S-sv is shifted over ½ the track width, the servo does not deviate and thus it is possible accurately control the amount of shift.

The description is returned to FIG. 13.

After the servo target position is shifted to the outer circumferential side during one disc cycle according to the method as described above, in other words, after the recording of one disc cycle is completed, on the contrary, the servo target position is gradually shifted to the inner circumferential side (see the trace between <2> and <3> in the drawing).

The shift to the inner circumferential side is performed in the same method as the method described in FIG. 14.

Specifically, the pit rows that are the servo target may be sequentially switched to the pit rows adjacent to the inner circumferential side while the saw-tooth waveform offset having the reverse direction inclination to the shift to the outer circumferential side is applied to the servo loop.

In this case, the velocity of returning the servo target position to the inner circumferential side may not be set to be the same as the velocity of the shift to the outer circumferential side. In this example, it is returned at the higher speed (e.g., about ¼ disc cycle).

For this reason, in this case, the magnitude of the inclination of the saw-tooth waveform offset applied to the servo loop is set to be larger (as absolution value) than the case of the saw-tooth waveform offset at the time of shifting to the outer circumferential side.

When the servo target position is gradually returned to the inner circumferential side, the irradiation spot S-rpS of the inner circumferential side beam represented by the white circle in the drawing is even gradually shifted to the inner circumferential side. When the operation of gradually returning the servo target position to the inner circumferential side is continued, the spot S-rpS is positioned in the vicinity of the mark row for which the first cycle recording is completed (in the drawing, <3> state).

In the embodiment, after the operation of gradually returning the servo target position to the inner circumferential side is started according to the completion of the first cycle recording as described above, monitoring of the tracking error signal TE-rpS (see FIG. 10) obtainable on the basis of the reflection light of the inner circumferential side beam is started.

In the tracking error signal TE-rpS, the change point obtainable when the spot S-rpS is positioned in the vicinity of the mark row for which the first cycle recording is completed is detected, and then the tracking servo control of the object lens 20 is switched to the servo control based on the reflection light of the inner circumferential side beam. That is, the switching to the self-tracking using the inner circumferential side beam is performed.

Figure 15A:
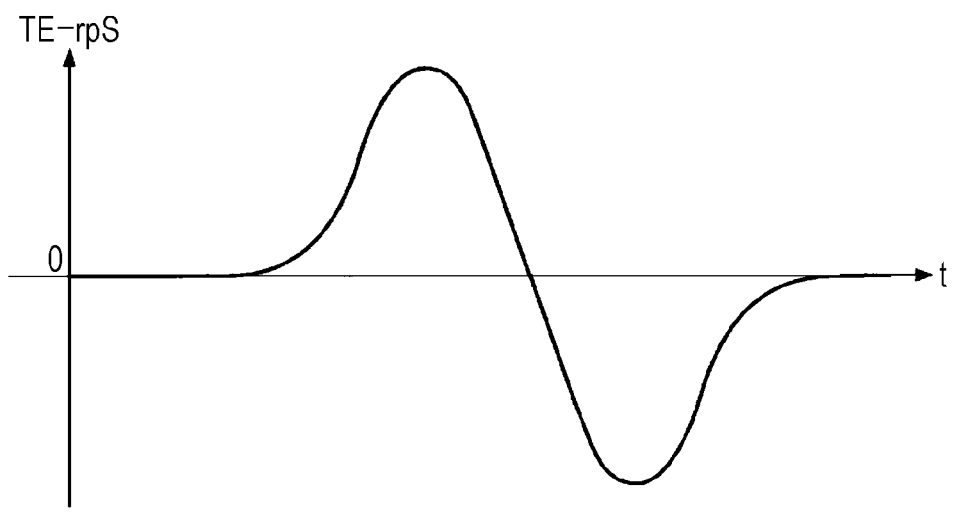
FIG. 15A and FIG. 15B are diagrams illustrating switching (drawing-in) to tracking servo based on a side beam.
Figure 15B:
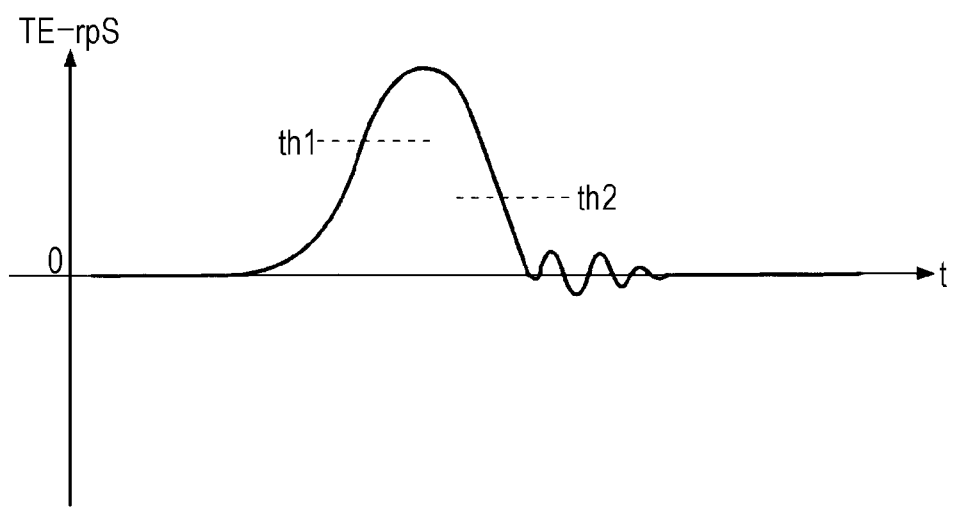

FIG. 15A and FIG. 15B are diagrams illustrating a specific example of the switching (drawing-in) to the tracking servo based on such a side beam.

FIG. 15A schematically shows a waveform of the tracking error signal TE-rpS observed when the servo target position is constantly shifted to the inner circumferential side.

When the servo target position is constantly shifted to the inner circumferential side as described above, the tracking error signal TE-rpS that is about 0 level to that time, the level gradually rises to reach the peak as the spot S-rpS gets closer to the center of the mark row for which the first cycle recording is completed. Thereafter, the level becomes zero-cross at the timing when the spot S-rpS coincides with the center of the mark row for which the recording is completed. When the spot S-rpS is further shifted to the inner circumferential side to get far away from the center of the mark row for which the recording is completed, the tracking error signal TE-rpS reaches the negative peak and changes to rising, and then it transits to about 0 level.

In this example, as for the tracking error signal TE-rpS obtained as described above, the switching to the servo control based on the inner circumferential side beam is performed by the method as shown in FIG. 15B.

First, as for the tracking error signal TE-rpS, two threshold values th1 and th2 as shown are preset. In this case, all the threshold values th1 and th2 are positive values as shown, in which the values are th1>th2.

In the servo control switching, the monitoring of the tracking error signal TE-rpS is started as described above, and then it is determined whether or not the value of the error signal TE-rpS is over the threshold value th1. When the value of the error signal TE-rpS is over the threshold value th1, it is determined whether or not the value of the error signal TE-rpS is less than the threshold value th2. By this determination, when it is determined that the value of the error signal TE-rpS is less than the threshold value th2, the drawing-in operation of the servo is performed in the side beam servo circuit 43 shown in FIG. 10, and the tracking driving signal TD-rpS output by the side beam servo circuit 43 is selected by the selector St.

Accordingly, the tracking coil of the 2-axis actuator 21 is driven by the tracking driving signal TD-rpS, and thus the tracking servo control of the object lens 20 can be switched to the servo control based on the reflection light of the side beam. That is, the process is transitioned to the self-tracking using the side beam.

As understood from the description, in the embodiment, the servo target position is shifted to the outer circumferential side (i.e., the reverse direction to the recording direction) by a predetermined amount at the completion time of the mark recording of one cycle.

Accordingly, it is possible to avoid the mark recording position to prevent the overlap or intersection of the recording mark rows of the first cycle and the second cycle in the vicinity of the recording completion position of the first cycle. That is, since the mark recording position can be avoided as described above, it is possible to prevent the overlap and intersection of the recording mark rows of the first cycle and the second cycle from occurring even when a relatively large spot position deviation caused by the deterioration of the slide mechanism or the disturbance in the vicinity of the recording completion position of the first cycle.

After avoiding the recording position as described above, the servo target position is shifted in the reverse direction to the recording direction, the tracking error signal TE-rpS obtainable at that time is monitored. When the change point when the spot S-rpS is positioned in the vicinity of the mark row for which the first cycle recording is completed is detected in the tracking error signal TE-rpS, the tracking servo control of the object lens 20 is switched to the servo control based on the reflection light of the inner circumferential side beam.

Accordingly, it is possible to appropriately perform the switching to the mark recording based on the self-tracking after avoiding the recording position.

By employing the recording method as the embodiment, even when the relatively large spot position deviation caused by the deterioration of the slide mechanism or the disturbance occurs in the vicinity of the recording completion position of the first cycle, it is possible to appropriately perform the switching to the self-tracking using the side beam and to realize the mark recording based on the self-tracking. Accordingly, it is possible to prevent the overlap or intersection of the mark rows on the bulk layer 5 from occurring and to prevent the recording capacity from being reduced.

Figure 16:
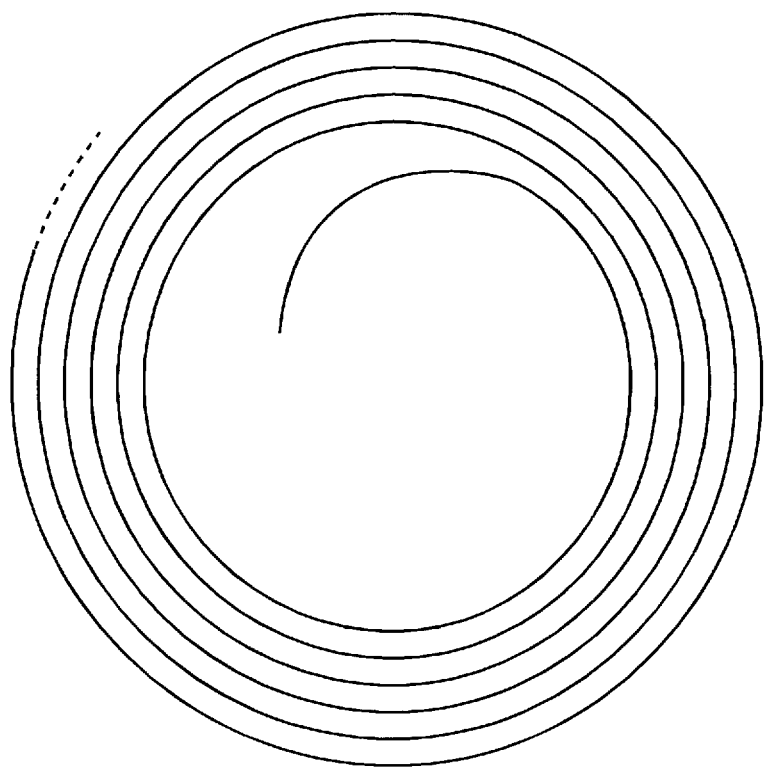
FIG. 16 is a diagram illustrating a trace of the mark row recorded by the recording method as the embodiment.

FIG. 16 shows a trace of the recording mark row when the mark recording is performed by the method as the embodiment described above.

As can be seen with reference to FIG. 16, according to the recording method of the embodiment, the interval of the mark row is widened only at the very small section from the first cycle to a part of the second cycle, and the mark row forming pitch is substantially regular in the bulk layer 5 in the view of the whole of the disc. For confirmation, in this case, the mark forming pitch coincides with the disposition interval between the main beam and the inner circumferential side beam.

According to the recording method as the embodiment as described above, it can be understood that the recording capacity is not substantially sacrificed.

5. Process Sequence

Subsequently, a sequence of a specific process to be performed to realize the recording method as the embodiment described above will be described with reference to the flowchart of FIG. 17.

Figure 17:
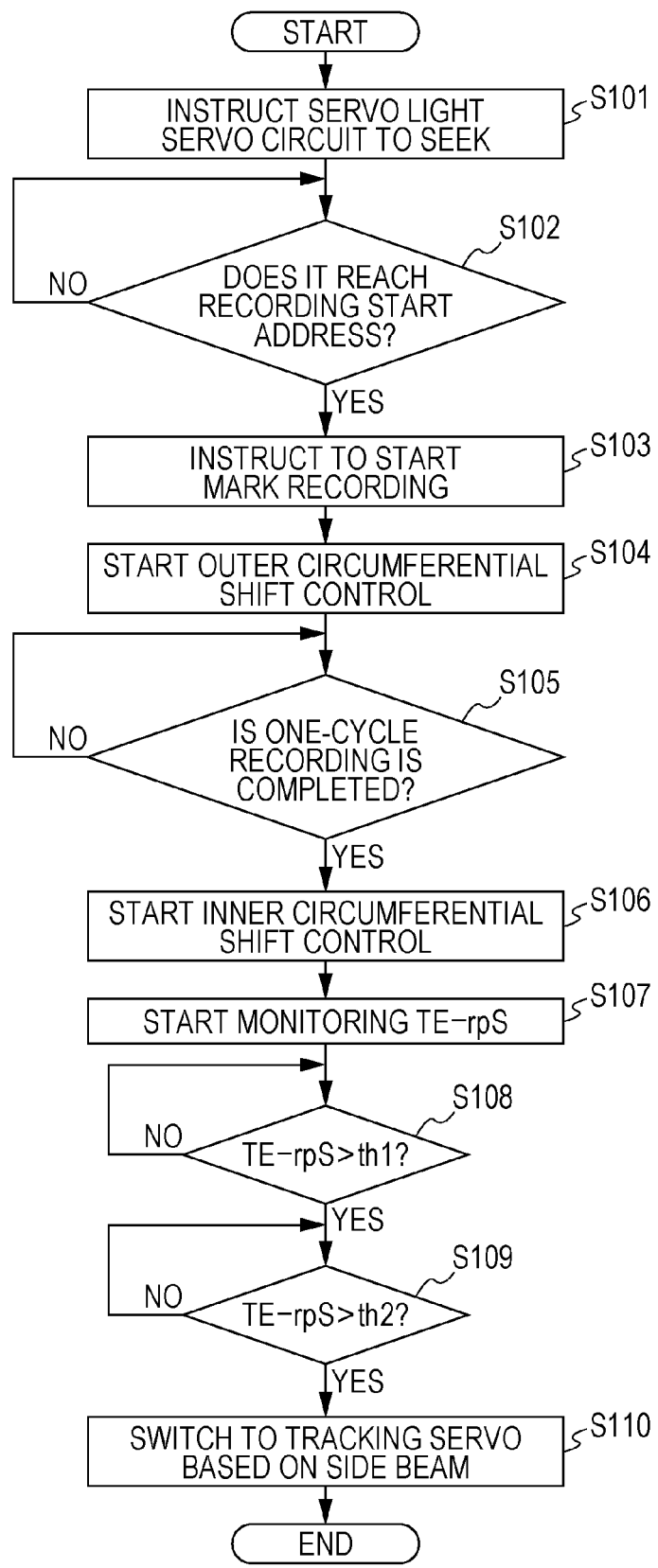
FIG. 17 is a flowchart illustrating a specific process sequence to be performed to realize the recording method as the embodiment.

In FIG. 17, the sequence of the specific process to realize the recording method as the embodiment is represented as a sequence of a process performed by the controller 40 shown in FIG. 10.

The controller 40 performs a process operation according to the sequence shown in the drawing according to the program stored in the memory such as the ROM of the controller 40.

First, in Step S101, a seek instruction to the servo light servo circuit 38 is performed.

That is, seek operation control for the recording start address that is the target address is performed in the servo light servo circuit 38. The details of the seek operation control have been already described, and thus the repeated description is omitted.

For confirmation, at the time point of Step S101, the controller 40 controls the selector St shown in FIG. 10 to select the tracking driving signal FD-sv from the servo light servo circuit 38.

In subsequent Step S102, it waits until reaching the recording start address.

When it reaches the recording start address, a mark recording start instruction is performed in Step 103. That is, the mark recording operation is started by the record processing unit 32.

In subsequent Step S104, outer circumferential shift control is started.

That is, the applying of the saw-tooth waveform offset to the adder 41 for shifting the servo target position to the outer circumferential side is started as described in FIG. 14, and the process for sequentially changing the pit rows that are the servo target is performed.

As understood from the above description, the switching of the pit rows that are the servo target is performed by the supply of the selection signal SLCT and the switching signal SC to the selector signal generating and selecting unit 39 (the selector signal selecting circuit 47) and the selective switching control of the selector S1.

Specifically, by the previous selection signal SLCT, the controller 40 performs the selection instruction of the selector signal of the pit row adjacent to the outer circumferential side of the pit row (selector signal) instructed by the previous selection signal SLCT on the selector signal selecting circuit 47 at the timing of the intermediate point between the adjacent pit rows described above.

As described in FIG. 10, in this example, the selector signal selecting circuit 47 selectively outputs the selector signal for the pit rows adjacent to the side (the outer circumferential side or the inner circumferential side) of the phase instructed by the switching signal SC, together with the selector signal of the phase instructed from the selection signal SLCT. The controller 40 transmits a signal of instructing to select the pit row adjacent to the outer circumferential side in the initial state, as the switching signal SC. Accordingly, the selector signal selecting circuit 47 in this case outputs the selector signal instructed by the selection signal SLCT, and the selector signal for the pit row adjacent to the outer circumferential side of the pit row corresponding to the selector signal.

As presupposition, by performing the seek operation control in Step S101, the selection instruction of any phase selector signal is performed by the selection signal SLCT from the controller 40 to the selector signal selecting circuit 47. As the switching signal SC as described above, the signal of instructing the selection of the pit row adjacent to the outer circumferential side is given in the initial state, and thus the selector signal selecting circuit 47 outputs the selector signal of the phase and the selector signal of the pit row adjacent to the outer circumferential side of the pit row corresponding to the selector signal by the performing the process of Step S101, from this point.

In this case, as for the selector signals output according to the first instruction from the controller 40 caused by the seek operation control of Step S101, the selector signal selecting circuit 47 outputs the selector signal on the side instructed by the selection signal SLCT to the sample hold circuit SH1, and outputs the selector signal of the pit row adjacent to the outer circumferential side of the pit row corresponding to the selector signal to the sample hole circuit SH2.

As described above, the selector S1 is controlled to selectively output the signal on the side representing the tracking error for the pit row to be considered as the target of the tracking servo between the tracking error signals TE$_1$-sv and TE$_2$-sv output by the sample hold circuits SH1 and SH2 according to the instruction from the controller 40. In other words, the controller 40 instructs the selector S1 to selectively output the tracking error signal TE$_1$-sv from the sample hold circuit SH1 when the first selection instruction by the selection signal SLCT to the selector signal selection circuit 47 performed by the seek operation control in Step S101 is performed. Accordingly, the tracking error signal TE-sv representing the tracking error for the pit row that is to be the target of the tracking servo is supplied to the servo light servo circuit 38.

When the first selection instruction is performed by the selection signal SLCT, the selector signal selecting circuit 47 outputs the instructed selector signal to the sample hold circuit SH1, and outputs the selector signal of the pit row adjacent to the outer circumferential side of the pit row corresponding to the instructed selector signal to the sample hold circuit SH2. In addition, the output signal (TE$_1$-sv) on the sample hold circuit SH1 side is selected by the selector S1, and the tracking error signal TE-sv representing the tracking error for the pit row that is to be target of the tracking servo is supplied to the servo light servo circuit 38.

The first state is changed to the state to switch the pit row that is the servo target to the pit row adjacent to the outer circumferential side by a new selector signal SLCT, the following operation is performed.

That is, when the selection instruction of the new selector signal (i.e., in this case, the selector signal of the pit row adjacent to the outer circumferential side of the pit row corresponding to the previously instructed selector signal) is instructed to be selected by the selection signal SLCT from the controller 40, the selector signal selecting circuit 47 continues supplying the selector signal being supplied to the sample hold circuit SH2 to the sample hold circuit SH2, and switches the selector signal supplied to the sample hold circuit SH1 to the selector signal for the pit row adjacent to the outer circumferential side of the pit row corresponding to the selector signal being supplied to the sample hold circuit SH2.

The controller 40 performs a new selection instruction by the selection signal SLCT as described above, and selectively outputs the tracking error signal TE$_2$-sv from the sample hold circuit SH2 by the selection switching instruction to the selector S1. Accordingly, the tracking error signal TE-sv representing the tracking error for the pit row that is to be newly the target of the tracking servo can be output to the side of the servo light servo circuit 38.

Thereafter, the selector signal selecting circuit 47 repeats the operation of keeping the supply state of the previous selector signal with respect to the sample hole circuit SH on the side of changing the previous selector signal between the sample hold circuit SH1 and the sample hold circuit SH2 whenever the selection instruction of the new selector signal is performed by the selection signal SLCT, and switching the supplied selector signal to the selector signal for the pit row adjacent to the outer circumferential side of the pit row corresponding to the selector signal supplied to the sample hold circuit SH on the kept side with respect to the sample hold circuit SH in which the previous selector signal is not changed and is supplied as it is.

The controller 40 performs the selection switching instruction of the selector S1 whenever the selection instruction to the selector signal selecting circuit 47 is performed by the selection signal SLCT.

As a result, the tracking error signal TE-sv representing the tracking error for the pit row that is to be servo target is typically supplied to the servo light servo circuit 38, and any one of the sample hold circuit SH1 and SH2 may obtain a state of generating the tracking error signal representing the tracking error for the pit row adjacent to the servo target pit row.

The description is returned.

In Step S104, the controller 40 performs the selection switching instruction to the selector S1 for every selection instruction while sequentially performing the selection instruction of the selector signal for the pit row adjacent to the outer circumferential side by the selection signal SLCT to the selector signal selecting circuit 47, thereby performing the operation of gradually switching the pit row that is the servo target to the pit row adjacent to the output circumferential side.

After the outer circumferential side shift control is started in Step S104, it waits until 1-cycle recording is completed in Step S105. It is determined whether or not the 1-cycle recording is completed on the basis of the address information (particularly, the rotation angle information) from the address detecting circuit 37 shown in FIG. 10.

In Step S105, when it is determined that the 1-cycle recording is completed, the inner circumferential side shift control is started in Step S106. That is, the process to gradually shift the target position of the tracking servo to the inner circumferential side is started. As the inner circumferential side control, the switching signal SC supplied to the selector signal selecting circuit 47 may be switched to the signal of instructing to select the selector signal for the pit row adjacent to the inner circumferential side, and then the same process as the outer circumferential side shift control described in Step S104 may be performed.

However, in this case, the selector signal selecting circuit 47 is configured to perform an operation described as follows, considering the point described hereinafter.

When assuming the time point of performing the selection instruction by the selection signal SLCT just before the inner circumferential side shift control is started in Step S106, the selector signal for the servo target pit row is given to the sample hold circuit SH on the side where the selector signal selecting circuit 47 keeps the selector signal without changing the selector signal at that time point, and the selector signal for the pit row further adjacent to the outer circumferential side of the servo target pit row is supplied to the sample hold circuit SH on the other side (i.e., the side of changing the selector signal). In this case, in the selector S1, the output from the former sample hold circuit SH (the side to which the selector signal of the servo target pit row is supplied) is selected.

At the time point just before starting the inner circumferential side shift control as described above, since the selector signal for the pit row adjacent to the inner circumferential side of the servo target pit row is not supplied to any of the sample of hold circuits SH1 and SH2, it is necessary to obtain the state of supplying the selector signal for the servo target pit row and the selector signal for the pit row adjacent to the inner circumferential side by the sample hold circuits SH1 and SH2, according to the first switching instruction to the pit row adjacent to the inner circumferential side.

For this reason, the selector signal selecting circuit 47 in this case is configured to perform the following operation according to the selection instruction by the new selection signal SLCT performed thereafter, when the instruction content of the switching signal SC is changed (i.e., the switching to the inner circumferential side shift control). That is, the selector signal selecting circuit 47 outputs the selector signal (i.e., the selector signal of the pit row adjacent to the inner circumferential side of the servo target pit row) to the sample hold circuit SH on the side of changing the supplied selector signal when the selection instruction is performed by the selector signal SLCT just before the new selection signal SLCT when the selection instruction is performed by the new selection signal SLCT after the instruction content is switched by the switching signal SC, and outputs the selector signal for the pit row further adjacent to the inner circumferential side of the pit row corresponding to the selector signal instructed by the new selection signal SLCT to the other sample hold circuit SH.

In this state, the controller 40 performs the selection instruction by the new selection signal SLCT, and performs the selection switching instruction of the selector S1, to supply the tracking error signal TE-sv representing the tracking error for the pit row that is to be newly the servo target to the servo light servo circuit 38. In addition, it is possible to obtain a state where the tracking error signal of the pit row adjacent to the inner circumferential side of the pit row that it to be servo target is generated together.

For confirmation, in this example, the amount of shifting the servo target position at one disc cycle to the outer circumferential side is two tracks, and thus the spot S-sv is positioned on any pit row at the completion of one cycle recording. For this reason, the saw-tooth waveform offset given to the adder 41 in the inner circumferential side shift control of Step S106 is started from 0 level.

After the inner circumferential shift control is started in Step S106 as described above, the monitoring of the tracking error signal TE-rpS is started in Step S107.

In Step S108, first, it waits until the level of the tracking error signal TE-rpS is over the threshold value th1 (i.e., the determination whether or not the level is over the threshold value th1 is repeatedly performed until the level is over the threshold value th1).

In Step S108, when the level of the tracking error signal TE-rpS is over the threshold value th1, it waits until the level of the tracking error signal TE-rpS is less than the threshold value th2 in Step S109.

In Step S109, when the level of the tracking error signal TE-rpS is less than the threshold value th2, the process for switching to the tracking servo based on the side beam is performed in Step S110.

That is, the drawing-in instruction of the tracking servo is performed on the side beam servo circuit 43, and the instruction to selectively output the tracking driving signal TD-rpS from the side beam servo circuit 43 is performed with respect to the selector St such that the tracking servo control for the object lens 20 is switched to the tracking servo control based on the reflection light of the inner circumferential side beam.

By performing the process of Step S110, thereafter, the mark recording on the bulk layer 5 is performed under the self-tracking.

After performing the process of Step S110, the series of processes shown in the drawing is ended.

6. Modified Example

The embodiment of the present disclosure has been described above, but the present disclosure is not limited to the specific example described hitherto.

For example, in the above description, when the servo target position is shifted to the recording direction by the predetermined shift amount to avoid the recording position, the position is gradually shifted during one disc cycle. However, the shift of the servo target position may be performed by a predetermined amount at the one cycle completion position, and it is not necessary to gradually shift the position necessarily during one cycle. For example, the set amount of shift may be performed at the ½ cycle time point, and the shift amount may be kept up to the one cycle completion.

In the above description, at the time of shift of the servo target position, the tracking error signal for the servo target pit row and the tracking error signal for the adjacent pit row are together obtained and thus two sample hold circuits SH are provided. However, one sample hold circuit SH may be provided to perform the switching of the pit row that is the servo target by momentarily switching the selector signal given to the sample hold circuit SH.

In this case, it is obvious that the selector S1 and the selector S2 are unnecessary.

In the above description, the case of performing the recording based on the parallel track pass about the multilayer recording is exemplified, but opposite track pass may be employed.

In the opposite track pass, the recording directions between the adjacent layer positions L are different from each other. Accordingly, to appropriately perform the self-tracking at each layer position L, the inner circumferential side beam and the outer circumferential side beam as the side beam have to be alternately and divisionally used between the adjacent layer positions L.

Specifically, as the configuration of the case corresponding to the opposite track pass, the inner circumferential side light receiving unit (in the embodiment, corresponds to the side beam detector 23S) for receiving the reflection light of the inner circumferential side beam and a light receiving unit for receiving the reflection light of the outer circumferential side beam are provided. In the layer position L in which the recording direction is from the inner circumference to the outer circumference, the self-tracking is performed on the basis of the tracking error signal generated on the basis of the light reception signal from the inner circumferential side light receiving unit. On the other hand, in the layer position L in which the recording direction is from the outer circumference to inner circumference, the self-tracking is performed on the basis of the tracking error signal generated from the light reception signal based on the outer circumferential side light receiving unit.

In the layer position L in which the recording direction is from outer circumference to the inner circumference, the avoiding of the recording position is performed on the inner circumferential side. That is, the avoiding of the recording position may be performed in a forward direction of the recording direction.

In the above description, the case of commonly using the light source to obtain the recording light taking in charge of the recording of the mark and the light source to obtain the light as the side beam for performing the self-tracking is exemplified, but they may be separated light sources.

However, cautiously, the mark recording light and the side beam have to be focused at the same layer position L to perform the recording based on the self-tracking. Accordingly, even when the light sources of the mark recording light and the side beam are separately provided, it is necessary that the mark recording light and the side beam are focused at the same layer position L, for example, all of the mark recording light and the side beam are configured to adjust the focus position by the expander (the fixed lens 14, the movable lens 15, and the lens driving unit 16).

In the above description, the case where the servo target position is shifted to the recording direction and then the timing of starting returning the servo target position to the reverse side to the recording direction is the recording completion timing of one disc cycle is exemplified, but the timing of starting retuning the servo target position to the reverse direction to the recording direction may be a timing of being the vicinity of the recording completion position of one disc cycle, and it is not necessary to strictly coincide with the recording completion timing of one cycle.

In the above description, in the servo drawing-in operation for the mark row for which the first cycle recording is completed by the side beam, the case of performing the drawing-in by the timing determination using the threshold values th1 and the threshold values th2 is exemplified, the timing of the drawing-in may be performed at a timing in the vicinity of zero-cross of the tracking error signal based on the reflection light of the side beam, and a specific method thereof is not particularly limited.

In the above description, the case of generating the tracking error signal based on the reflection light of the side beam by the DPD method is exemplified, but the method of generating the tracking error signal is not limited thereto, for example, it may be generated by the other method such as a DPP (Differential Push-Pull) method.

In the above description, the case of performing the determination whether or not one disc cycle recording is completed on the basis of the address information read from the optical disc recording medium is exemplified, but for example, a rotation angle detecting unit that detects a rotation angle of a spindle motor rotating the optical disc recording medium may be provided and it may be determined whether or not one disc cycle recording is completed on the basis of the rotation angle information detected by the rotation angle detecting unit.

Figure 18:
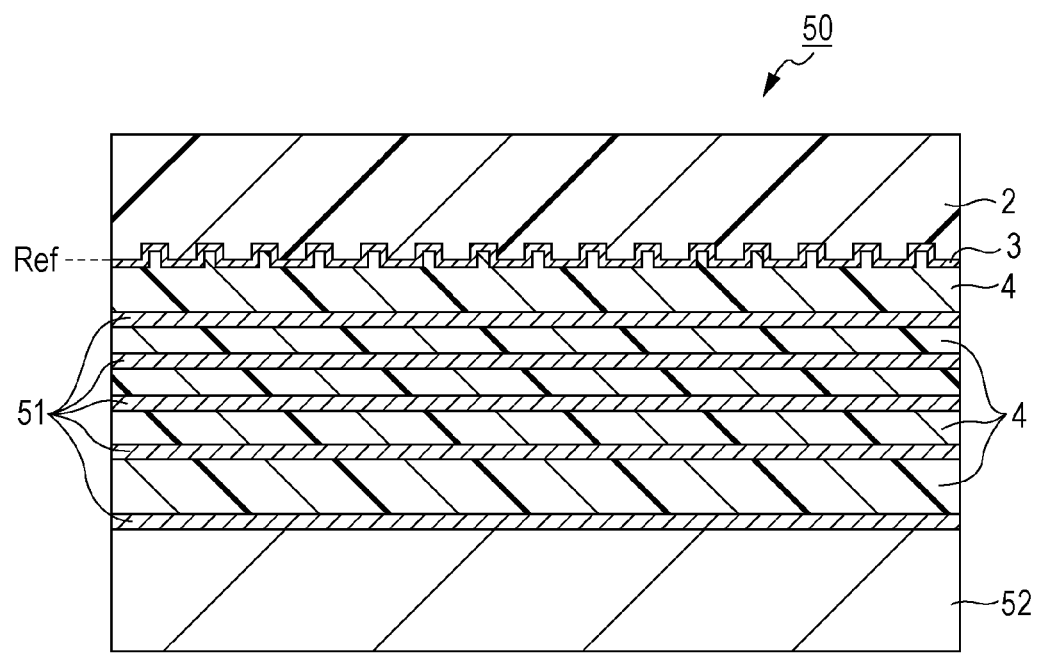
FIG. 18 is a cross-sectional structural diagram of a multilayer recording medium.
Figure 19:
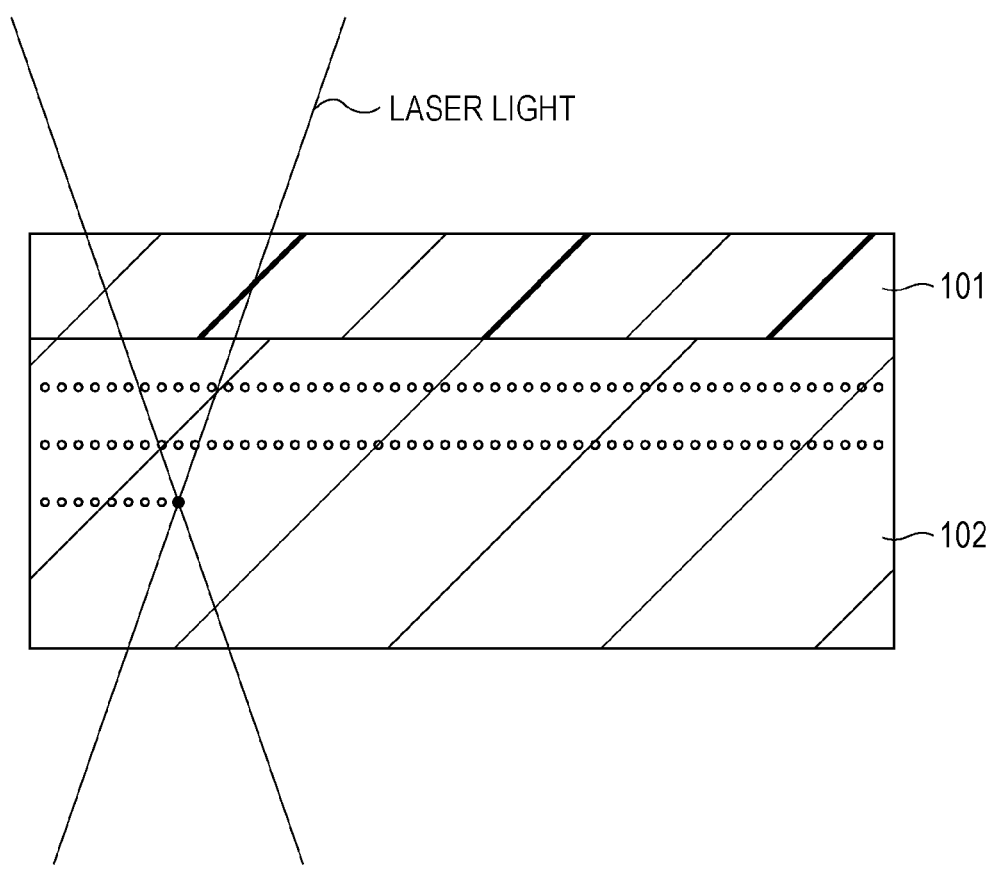
FIG. 19 is a diagram illustrating a bulk recording method.
Figure 20:
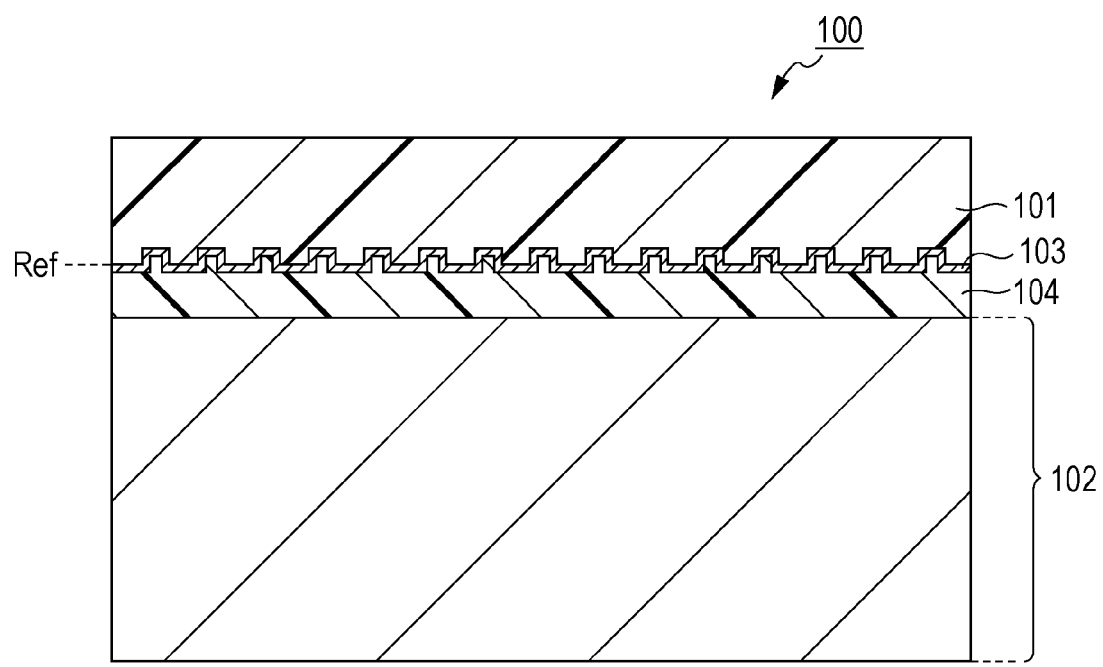
FIG. 20 is a diagram illustrating an example of a cross-sectional structure of an actual bulk type recording medium provided with a reference face.

In the above description, the case of applying the present disclosure to the case of performing the information recording on the bulk type recording medium 1 as a target is exemplified, but the present disclosure may be very appropriately applied to a case of performing the recording on the multilayer recording medium 50 as shown in FIG. 18.

In FIG. 18, the multilayer recording medium 50 is the same as the bulk type recording medium 1 shown in FIG. 1 in that the cover layer 2, the selective reflection film 3, and the intermediate layer 4 is formed in order from the upper layer side, but in this case, a recording layer having a layer structure in which semi-transparent recording films 51 and intermediate layers 4 are repeatedly laminated a predetermined number of times is laminated, instead of the bulk layer 5. As shown, the semi-transparent recording film 51 formed on the lowest layer is laminated on a substrate 52. A total-reflection recording film may be used as the recording film formed on the lowest layer.

Cautiously, the semi-transparent recording film 51 has to be provided with no position guide formed of pit rows or grooves. That is, even in the case of the multilayer recording medium 50, the position guide as shown in FIG. 4 or FIG. 5 is formed only on one layer position as the reference face Ref.

In the recording layer of the multilayer recording medium 50, since the semi-transparent recording film 51 serving as a reflection film is formed, it is possible to perform the focus control using the reflection light of the recording and reproducing laser light even at the recording time.

That is, at the recording time in this case, the focus servo control for the recording and reproducing laser light is performed to be focused on the semi-transparent recording film 51 that is the recording target by driving the lens driving unit 16 on the basis of the reflection light of the recording and reproducing laser light.

For confirmation, even when the recording is performed on the multilayer recording medium 50, the recording method may be the method described hitherto.

In the above description, the case of forming the reference face Ref on the upper layer side than the recording layer is exemplified, but the present disclosure may be very appropriately applied to a case of forming the reference face Ref on the lower layer side than the recording layer.

In the above description, a total of 6 pit rows A to F as the plurality of pit rows having different pit row phases are set on the reference face Ref, the pit rows based on the 6 patterns (pit row phases) are repeatedly formed in the radial direction, but the number of the plurality of pit rows is not limited to 6, and the number of pit rows may be a more number or a less number.

In the above description, the case where the section length of each pit formable position in the pit rows is the section length of 3T and the interval between the edges of the pit formable positions in the pit forming direction is set to the length of 3T is exemplified, but they are merely an example. The section length of each pit formable position and the interval between edges of the pit formable positions in the pit row forming direction may be set to satisfy the conditions of 1) and 2) described above.

In the above description, in the plurality of pit rows having different pit row phases, the pit rows are arranged such that the pit row phase proceeds as much as the outer circumferential side and the pit row phase is deviated as much as the inner circumferential side, the arrangement pattern of the plurality of pit rows may be set to various patterns under the condition in which it does not exceed the optical limit in the pit row forming direction, for example, the pit row phase proceeds as much as the inner circumferential side and the pit row phase is deviated as much as the outer circumferential side.

In the above description, the case of forming the pit rows in the spiral shape is exemplified, but the pit rows may be formed in a concentric shape.

In the above description, in the reference face Ref, the case of employing the variable track pitch format as shown in FIG. 4 or FIG. 5 and performing the shift of the servo target position at the time of the avoiding of the recording position or the transition to the self-tracking by performing the applying of the saw-tooth waveform offset to the servo loop and the switching of the servo target pit row is exemplified, but pit rows or grooves may be formed on the reference face Ref by a predetermined track pitch more than the limit track pitch of the related art, and the shift of the servo target position may be performed only by applying the offset to the servo loop.

In the above description, means for correcting the spot position difference in the recording and reproducing laser light with respect to the servo laser light caused by the skew or the lens shift of the object lens 20 is not particularly provided, but such correction means may be provided. Specifically, a skew detecting unit that detects skew and a lens shift detecting unit that detects the amount of lens shift of the object lens 20 are provided, the spot position deviation caused by the skew or the lens shift is calculated from the detection signal, and for example, an optical axis of the recording and reproducing laser light is corrected according to the calculated amount of difference.

In the above description, the case of applying the present disclosure to the recording and reproducing device performing both of recording and reproducing on the optical disc recording medium is exemplified, the present disclosure may be also very appropriately applied to a recording-only device (a recording device) capable of only recording on the optical disc recording medium.

The present disclosure contains subject matter related to that disclosed in Japanese Priority Patent Application JP 2010-132208 filed in the Japan Patent Office on Jun. 9, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A recording device to perform recording on an optical disc recording medium having a reference face having a reflection film provided with a position guide, and having a recording layer provided at a position of a depth different from that of the reference face and configured to perform information recording by forming marks according to irradiation of light, the recording device comprising:
    a light generating and irradiating unit configured to generate
        a first light beam for performing information recording on the recording layer in a recording direction,
        a second light beam for performing position control based at least in part on the position guide formed on the reference face, and
        a third light beam,
        the third light beam having an irradiation spot being positioned in a reverse direction relative to a progress direction of a recording and relative to irradiation spot positions of the first and second light beams,
        wherein the progress direction of the recording is the recording direction with respect to a radial direction of the optical disc recording medium, and
        the first, second, and third light beams emitted such that the first light beam and the third light beam are focused on the recording layer and the second light beam is focused on the reference face;
    an object lens to which the first, second, and third light beams are incident,
    a recording unit, configured to perform light emission driving control for the first light beam to perform mark recording on the recording layer;
    a tracking mechanism, configured to drive the object lens in a tracking direction that is parallel to the radial direction of the optical disc recording medium;
    a first tracking error signal generating unit, configured to generate a first tracking error signal based at least in part on a result of receiving reflection light of the second light beam from the reference face;
    a second tracking error signal generating unit, configured to generate a second tracking error signal based at least in part on a result of receiving reflection light of the third light beam from the recording layer;
    a tracking servo control unit, configured to perform tracking servo control on the object lens by driving the tracking mechanism based at least in part on the first or second tracking error signal; and
    a control unit,
    wherein the control unit:
        is configured to control the recording unit to start the mark recording in a state where tracking servo control is performed by the tracking servo control unit based at least in part on the first tracking error signal,
        is configured to start applying a forward direction offset for gradually shifting an irradiation spot position of the second light beam in the recording direction on a tracking servo loop based at least in part on the first tracking error signal,
        is configured to start applying a reverse direction offset for gradually shifting an irradiation spot position of the second light beam in the reverse direction to the recording direction on the tracking servo loop at the time of reaching a vicinity of a completion position of mark recording of one cycle of a disc,
        is configured to monitor the second tracking error signal under application of the reverse direction offset, and
        is configured to control the tracking servo control performed by the tracking servo control unit to be switched to tracking servo control that is based at least in part on the second tracking error signal, according to detection of a change point represented by an irradiation spot of the third light beam being positioned in a vicinity of the mark row for which first cycle recording is completed, with respect to the second tracking error signal.

2. The recording device according to claim 1, wherein the control unit is configured to control the tracking servo control performed by the tracking servo control unit to be switched to the tracking servo control that is based at least in part on the second tracking error signal, when the second tracking error signal is more than a first threshold value and is less than a second threshold value.

3. The recording device according to claim 1, wherein the light generating and irradiating unit is provided with a focus position adjusting unit to change collimation of the first and third light beams incident to the object lens to change the focus position of the first and third light beams independently from the second light beam, and to focus the first light beam and the third light beam on the recording layer by the focus position adjusting unit.

4. The recording device according to claim 1, wherein the reference face is configured such that a pit row in which an interval of pit formable positions in one cycle is limited to a first interval and the pit row is formed in a spiral shape or a concentric shape, and an interval in a pit row forming direction of the pit formable positions is set to a position each deviating by a predetermined second interval in pit rows arranged in the radial direction, to have a plurality of pit row phases, and wherein the recording device further comprises:

a clock generating unit configured to generate a clock according to a forming interval of the pit at least in part on the basis of a light reception signal obtainable by receiving reflection light of the second light beam from the reference face;

a timing selection signal generating unit configured to generate a plurality of timing selection signals representing timing of the pit formable positions for a plurality of pit rows having different pit row phases formed on the reference face at least in part on the basis of a clock generated by the clock generating unit; and a timing selection signal selecting unit configured to select an instructed timing selection signal from the plurality of timing selection signals generated by the timing selection signal generating unit, wherein the first tracking error signal generating unit is configured to perform sampling on a signal obtainable by receiving the reflection light of the second light beam at the timing of the pit formable position represented by the timing selection signal selected by the timing selection signal selecting unit to generate a signal representing a tracking error for the pit row representing the timing of the pit formable position by the selected timing selection signal among the plurality of pit rows, as the first tracking error signal; and wherein the control unit is configured to enable gradually shifting, by the forward direction offset, the irradiation spot of the second light beam in the recording direction, the shift by the forward direction offset being performed by instructing the timing selection signal selecting unit to select a first timing selection signal, such that a pit row that is a target of the tracking servo based at least in part on the first tracking error signal can be switched over to an adjacent pit row adjacent in the recording direction, while an offset of a saw tooth shaped waveform set for an inclination thereof is being given to realize shift in the recording direction, and wherein the control unit is also configured to enable gradually shifting, by the reverse direction offset, the irradiation spot of the second light beam in the reverse direction, the shift by the reverse direction offset being performed by instructing the timing selection signal selecting unit to select a second timing selection signal, such that the pit row that is the target of the tracking servo based at least in part on the first tracking error signal can be switched over to an adjacent pit row adjacent in the reverse direction, while an offset of a saw tooth shaped waveform set for an inclination thereof is being given to realize shift in the reverse direction.

5. The recording device according to claim 4, wherein, on the reference face, position information on the optical disc recording medium is configured to be recorded for each pit row by a forming or non-forming pattern of a pit at a pit formable position on each pit row, wherein the reference face is provided with a position information detecting unit configured to determine a channel data value of a reproducing signal obtainable at least in part on the basis of a light reception signal at a timing of the pit formable position represented by the timing selection signal selected by the timing selection signal selecting unit to detect the position information at least in part on the basis of the determination result, and wherein the control unit is configured to detect a completion timing of mark recording of one cycle of the optical disc recording medium at least in part on the basis of the position information detected by the position information detecting unit.

6. A recording method of performing recording on an optical disc recording medium having a reference face having a reflection film provided with a position guide, and having a recording layer provided at a depth different from that of the reference face, and performing information recording by forming marks according to irradiation of light, the method comprising:

generating
a first light beam for performing information recording on the recording layer in a recording direction,
a second light beam for performing position control based at least in part on the position guide formed on the reference face, and
a third light beam;

providing an object lens to which the first, second, and third light beams are incident;

positioning an irradiation spot of the third light beam on a side of a reverse direction to the recording direction with respect to irradiation spot positions of the first and second light beams when a progress direction of recording is the recording direction with respect to a radial direction of the optical disc recording medium;

irradiating the first, second, and third light beams such that the first light beam and the third light beam are focused on the recording layer and the second light beam is focused on the reference face;

driving a tracking mechanism that drives the object lens in a tracking direction that is a direction parallel to the radial direction of the optical disc recording medium at least in part on the basis of a first tracking error signal generated at least in part on the basis of a result of receiving reflection light of the second light beam from the reference face or a second tracking error signal generated at least in part on the basis of the result of receiving reflection light of the third light beam from the recording layer, controlling a tracking servo control unit performing tracking servo control on the object lens to perform mark recording based at least in part on the first light beam on the recording layer in a state where track servo control based at least in part on the first tracking error signal is performed, starting to apply a forward direction offset for gradually shifting an irradiation spot position of the second light beam in the recording direction on a track servo loop based on the first tracking error signal; and starting to apply a reverse direction offset for gradually shifting an irradiation spot of the second light beam in the reverse direction to the recording direction on the tracking servo loop at a timing of a vicinity of a completion position of mark recording of one cycle of a disc and monitoring the second tracking error signal under application of the reverse direction offset, to control the tracking servo control performed by the tracking servo control unit to be switched to tracking servo control that is based at least in part on the second tracking error signal according to detection of a change point represented according to an irradiation spot of the third light beam being positioned in a vicinity of a mark row for which first cycle recording is completed, with respect to the second tracking error signal.

* * * * *